United States Patent
Hashimoto et al.

(10) Patent No.: US 7,866,016 B2
(45) Date of Patent: Jan. 11, 2011

(54) EQUIPMENT FOR PRODUCING LIGHT GAUGE SHAPE SHEET STEEL

(75) Inventors: Shinichiro Hashimoto, Chiyoda-ku (JP); Tomohisa Hirakawa, Chiyoda-ku (JP); Jun Shimizu, Chiyoda-ku (JP); Yoshitomo Ito, Chiyoda-ku (JP); Kimihiko Imai, Chiyoda-ku (JP); Yoshimitsu Murahashi, Chiyoda-ku (JP); Tetsushi Horibe, Kani (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 12/839,827

(22) Filed: Jul. 20, 2010

(65) Prior Publication Data

US 2010/0281939 A1  Nov. 11, 2010

Related U.S. Application Data

(62) Division of application No. 11/933,622, filed on Nov. 1, 2007, which is a division of application No. 10/485,324, filed on Jul. 15, 2004, which is a division of application No. PCT/JP02/04857, filed on May 20, 2002.

(30) Foreign Application Priority Data

Jul. 27, 2001 (JP) ............................. 2001-227065
Oct. 11, 2001 (JP) ............................. 2001-314230

(51) Int. Cl.
*B23P 23/04* (2006.01)

(52) U.S. Cl. ..................... 29/33 Q; 83/691; 72/405.01; 72/129; 72/131; 72/341

(58) Field of Classification Search ................. 29/33 Q, 29/33 S, 564, 563, 33 P, 564.1, 564.6, 564.7, 29/564.8, 897.3, 897.32; 83/684, 685, 686, 83/687, 688, 689, 691; 72/405.01, 129, 131, 72/404, 177, 371; 52/745.01, 745.19
See application file for complete search history.

(56) References Cited

U.S. PATENT DOCUMENTS

| | | | | |
|---|---|---|---|---|
| 2,397,029 A | * | 3/1946 | McLaughlin et al. | 29/33 Q |
| 3,393,547 A | * | 7/1968 | Kortan | 72/131 |
| 3,789,489 A | * | 2/1974 | Valente | 29/564 |
| 4,655,067 A | * | 4/1987 | Frost et al. | 72/131 |
| 2004/0064929 A1 | * | 4/2004 | Yokabitus et al. | 29/564 |
| 2005/0044133 A1 | * | 2/2005 | Hashimoto et al. | 700/182 |
| 2008/0065252 A1 | * | 3/2008 | Hashimoto et al. | 700/107 |

FOREIGN PATENT DOCUMENTS

| | | | |
|---|---|---|---|
| JP | 11-156460 A | * | 6/1999 |
| JP | 2004-082154 | * | 3/2004 |

* cited by examiner

*Primary Examiner*—Erica E Cadugan
(74) *Attorney, Agent, or Firm*—Baker Botts LLP

(57) ABSTRACT

An information processing system for producing a building material has a design drawing generator, a list generator and a member production controller. The design drawing generator generates design drawing information of an objective building. The list generator generates list information of the members used for the objective building. The member production controller controls the production of the members used for the objective building, based on the list information.

2 Claims, 30 Drawing Sheets

Fig. 4

1. SETTING OF CROSS SECTION, ETC. OF SHAPE SHEET STEEL
(FUNCTION SHARED OF GENERATING WALL, FLOOR AND ROOF TRUSS PANEL DRAWINGS)

LIST OF CROSS SECTION OF MEMBERS USED

| PART | ARRANGED MEMBER | MATERIAL CLASS/NAME | WEB | FLANGE | STEEL MEMBER THICKNESS | LIP LENGTH | MATERIAL LENGTH |
|---|---|---|---|---|---|---|---|
| BASE | BASE | LUMBER 404-3000 | 89.00mm | 89.00mm | 0.00mm | 0.00mm | 3000.00mm |
| 1F END SLEEPER | SINGLE-SHEET END SLEEPER | STEEL MEMBER 140CN12 | 143.00mm | 40.00mm | 1.20mm | 0.00mm | 0.00mm |
| 1F SIDE SLEEPER | DOUBLE-SHEET SIDE SLEEPER | COMPOSITE 140LCN12 (0250) | 140.00mm | 80.00mm | 0.00mm | 0.00mm | 0.00mm |
| 1F FLOOR SLEEPER | SINGLE-SHEET FLOOR SLEEPER | STEEL MEMBER 140LCN12 | 140.00mm | 40.00mm | 1.20mm | 12.00mm | 0.00mm |
| 1F FLOOR FACE PLATE | FLOOR FACE PLATE | PLYWOOD STRUCTURAL PLYWOOD (15-3) | 910.00mm | 15.00mm | 0.00mm | 0.00mm | 0.00mm |
| 2F END SLEEPER | SINGLE-SHEET END SLEEPER | STEEL MEMBER 235CN12 | 238.00mm | 40.00mm | 1.20mm | 0.00mm | 2730.00mm |
| 2F SIDE SLEEPER | DOUBLE-SHEET SIDE SLEEPER | COMPOSITE 235LCN12 (0250) | 235.00mm | 80.00mm | 0.00mm | 0.00mm | 0.00mm |
| 2F FLOOR SLEEPER | SINGLE-SHEET FLOOR SLEEPER | STEEL MEMBER 235CN12 | 235.00mm | 40.00mm | 1.20mm | 20.00mm | 0.00mm |
| 2F FLOOR FACE PLATE | FLOOR FACE PLATE | PLYWOOD STRUCTURAL PLYWOOD (15-3) | 910.00mm | 15.00mm | 0.00mm | 0.00mm | 0.00mm |
| LOWER RUNNER | LOWER RUNNER | STEEL MEMBER 089CN12 | 92.00mm | 40.00mm | 1.20mm | 0.00mm | 2730.00mm |
| STUD | SINGLE-SHEET STUD | STEEL MEMBER 089LGM12 | 89.00mm | 44.50mm | 1.20mm | 12.00mm | 0.00mm |
| UPPER RUNNER | UPPER RUNNER | STEEL MEMBER 089CN12 | 92.00mm | 40.00mm | 1.20mm | 0.00mm | 0.00mm |

16. AUTOMATIC TOTALIZATION AND TRANSMISSION OF SHAPE STEEL PRODUCTION DATA

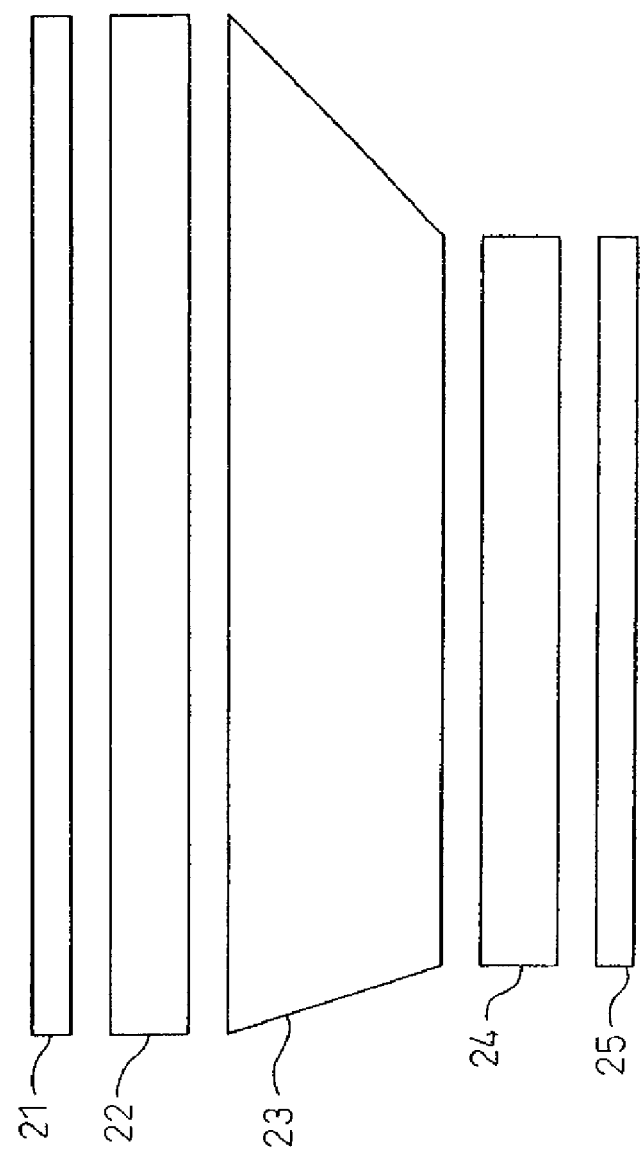
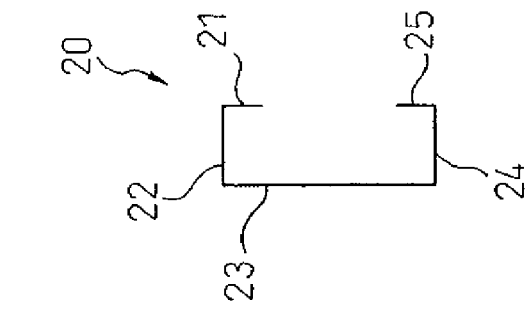

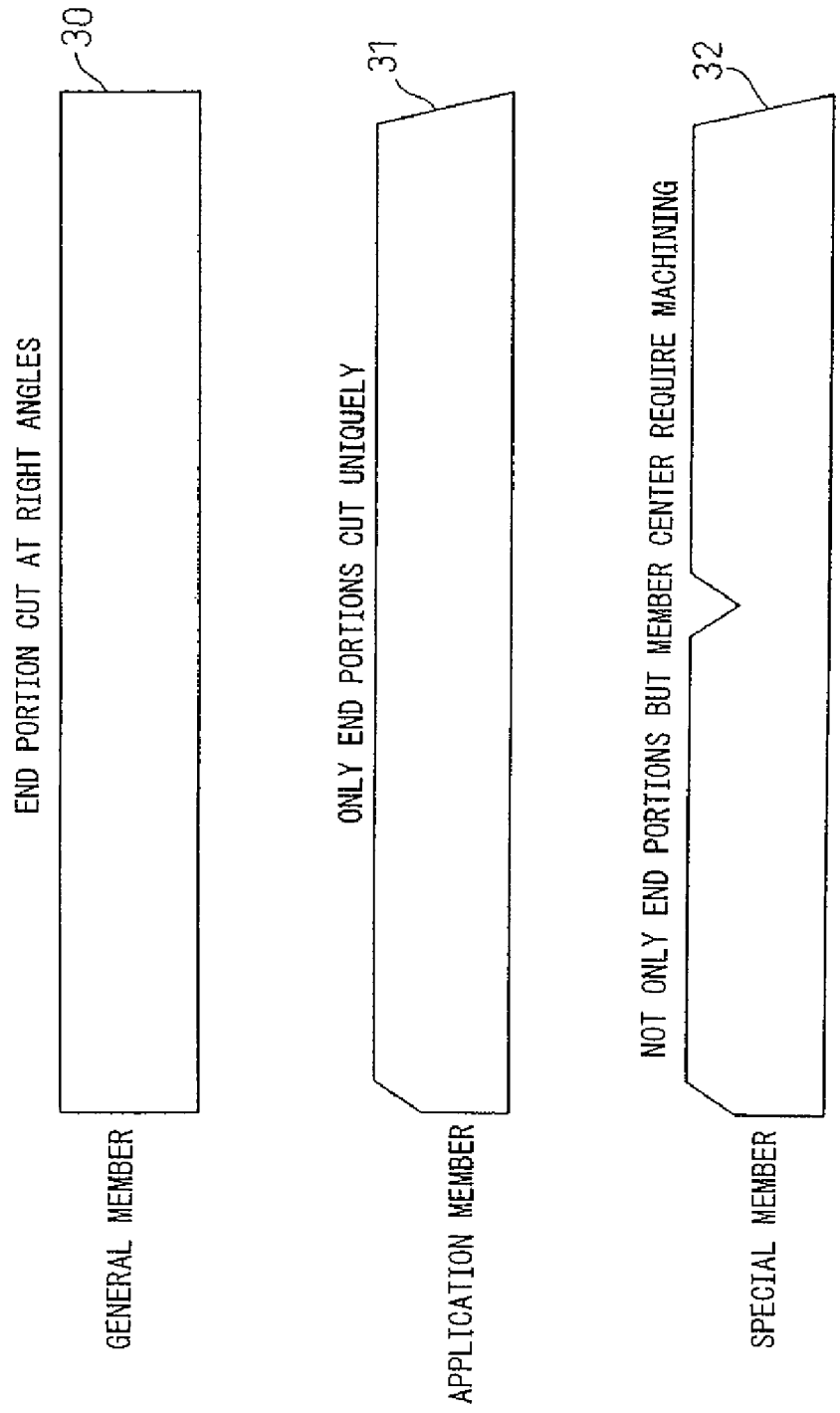

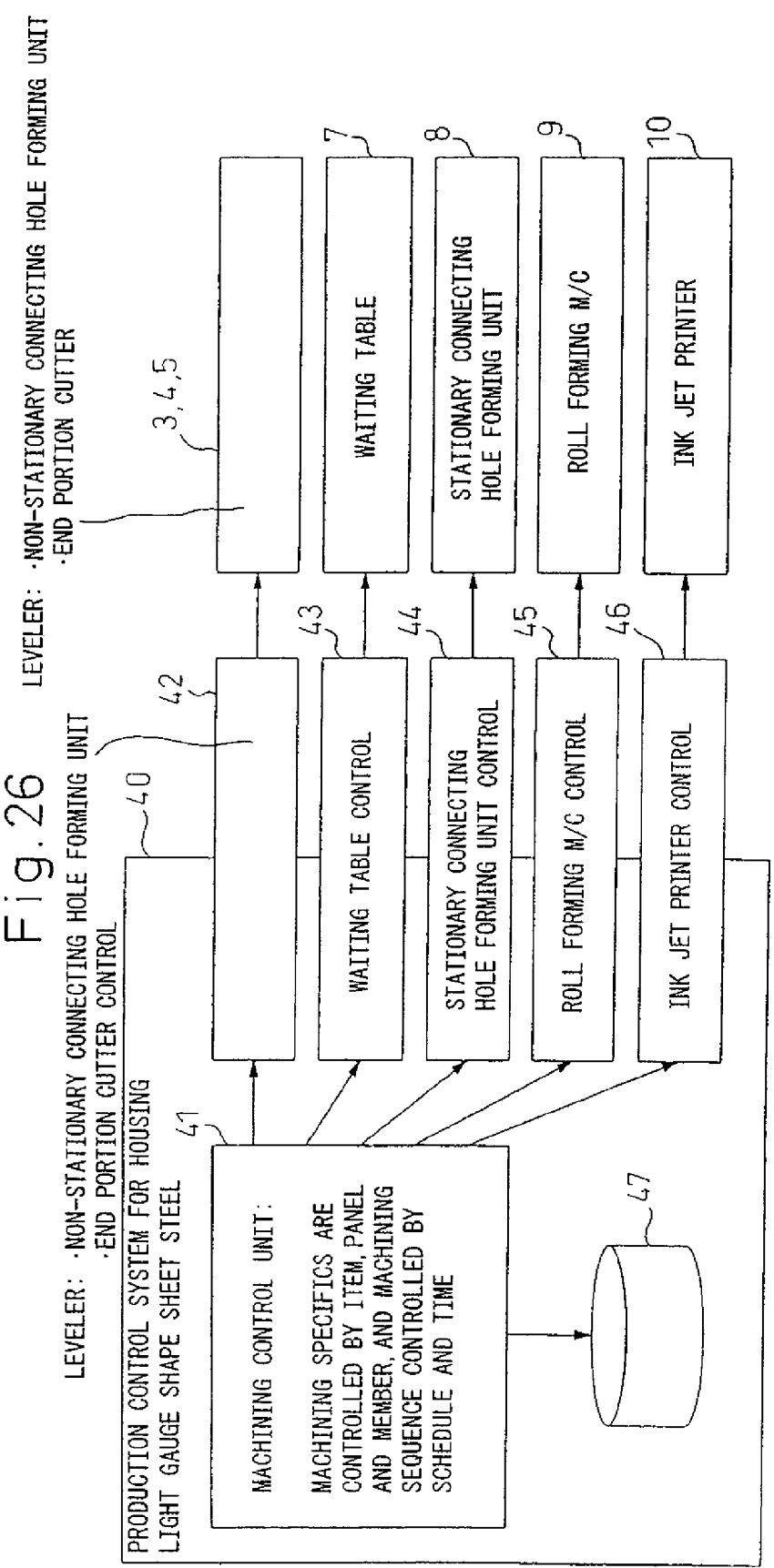

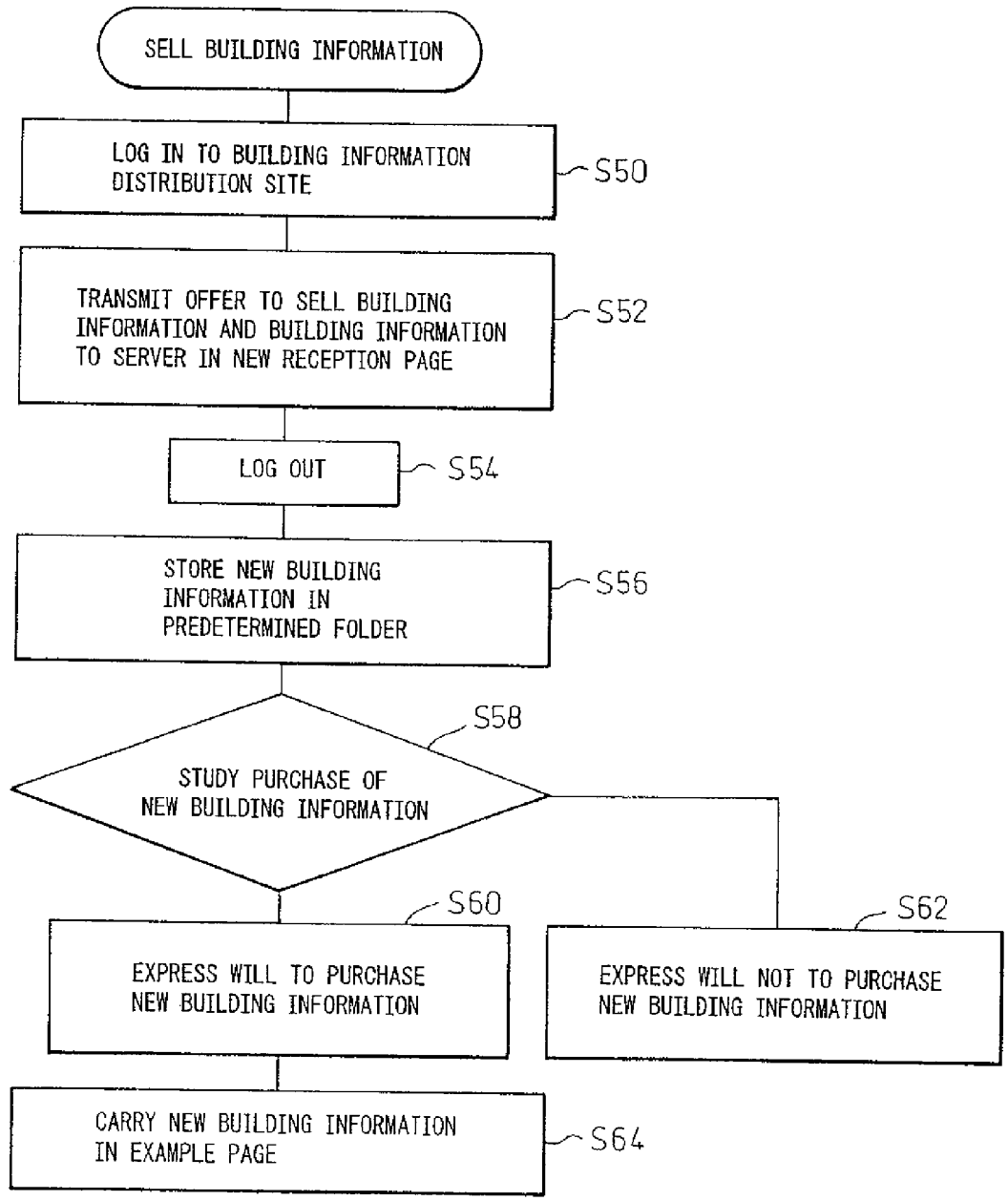

EQUIPMENT FOR PRODUCING LIGHT GAUGE SHAPE SHEET STEEL

CROSS-REFERENCE TO RELATED APPLICATIONS

This application is a divisional of U.S. patent application Ser. No. 11/933,622 filed on Nov. 1, 2007, which is a divisional of U.S. patent application Ser. No. 10/485,324, now abandoned, filed on Jul. 15, 2004 as a national stage application of PCT Application No. PCT/JP02/04857, which was filed on May 20, 2002, and published on Feb. 13, 2003 as International Publication No. WO 03/012562 (the "International Application"). This application claims priority from the International Application pursuant to 35 U.S.C. §365. The present application also claims priority under 35 U.S.C. §119 from Japanese Patent Application Nos. 2001-227065 and 2001-314230, filed on Jul. 27, 2001 and Oct. 11, 2001, respectively, the entire disclosures of which are incorporated herein by reference.

FIELD OF THE INVENTION

The present invention relates to an information processing system, a building material production method and production equipment for producing a building material used for a steel house or, e.g., a panel formed by combining light gauge shape sheet steel, and a building information distribution system for distributing the steel house building information using a network such as WAN (Wide Area Network). As described herein, a low building having a frame member and a face plate or a brace of a surface-treated light gauge shape steel for a building structure can be referred to as a steel house. Also, the building information can include information regarding general drawings (design drawing, structure drawing, equipment drawing, etc.) that can be used by building contractors to construct a building.

BACKGROUND INFORMATION

The use of a steel house constituting a low building including a house built of building materials such as a light gauge shape sheet steel and panels has been recently extending as the result of improvement in the living comfort, structure and production cost. One problem of a steel house is the building cost. In order to reduce the building cost, the workability is improved by structural improvement of the building materials such as shape steel and panels or by improvement of the production system of the building materials. The present invention relates to a reduction of production costs of the building materials by improving the productivity as due to improved production equipment and an improved production control system for the light gauge shape sheet steel for a steel house.

In connecting the light gauge shape sheet steel, the time consumed for the connecting work at the factory or the construction site can be shortened while at the same time significantly improving the connection a strength of the shape steel by forming connecting holes in the frame member in advance. According to the present invention, a shape steel formed of sheet steel having a thickness of not less than 0.4 mm but less than 2.3 mm can be used (called a light gauge shape sheet steel). Each of the fastening tools such as a tapping screw and a one-side rivet generally used for connecting the light gauge shape sheet steel are low in connection strength as compared with the bolt used for an iron frame building. In order to secure a sufficient connection strength, many fastening tools are usually utilize which in turn need a multiplicity of fastening holes to be formed in the light gauge shape sheet steel for the fastening tools.

In producing the light gauge shape sheet steel formed with fastening holes, the fastening holes are generally formed with the sheet steel kept stationary before the roll forming step, but the fastening holes are not formed in the sheet steel moving after the step of straightening the curl caused by the leveler. An increased number of fastening holes formed with the sheet steel kept stationary extremely reduces the production efficiency. Also, in the case where the fastening holes are formed with the sheet steel kept stationary, a comparatively large waiting table for holding the sheet steel in standby state is required as a buffer, and therefore a large space is required to install the production line. Further, the problem of a reduced overall production is posed depending on the productivity of the machine for forming the fastening holes.

On the other hand, a CAD system (Computer Aided Design system) can be used as a design aiding system in various fields. Also, a CAM system (Computer Aided Manufacturing system) may be used to control the production equipment for machining and assembly based on the data obtained from the CAD system. In the field of the low house using light gauge shape sheet steel, buildings and building materials, such as shape steel and panels, have been designed using the CAD system. However, the building materials are not produced using the CAD/CAM systems. In order to produce building materials in accordance with the building design data generated by CAD, therefore, various processes need to be executed manually to move the building design data from CAD to the building materials production machine. This, in turn, reduces the production efficiency of the building materials for a steel house.

Japanese Patent Publication No. 11-232320 describes a design aiding CAD system for iron frame structures using a steel plate not thinner than 2.3 mm and the data generated by the CAD system for machining in the factory. The application field of this system disclosed in the publication is limited to the iron frame structure and the system is not applicable to the production of building materials from sheet steel having a thickness not less than 0.4 mm but less than 2.3 mm used for a low building. Also, the configuration described in this publication is not a system for aiding the design and production by relating the CAD system to the CAM system.

Accordingly, exemplary embodiments of the present invention are provided to solve the problem of the prior art described above. One of the objects of the present invention is to provide an information processing system, a building material production method and production equipment capable of efficiently producing a building material of a steel house.

The light gauge shape sheet steel can be classified into three types including a general member used for general purposes of a steel house, an application member having the same cross section and the same fastening hole specification as the general member but a different shape of the end portion connected to other shape steel, and a special member having a unique shape and difficult to produce on a production line adapted for the general member and the application member. In the prior art, therefore, the special member is unavoidably produced on a production line, for machining the special member, different from the production line for the general member and the application member. The provision of the two production lines including the one for the general member and the application member and the one for the special member not only increases the installation area of the production lines but also requires an independent control system for controlling each production line, thereby complicating the production control system.

In the conventional production control system for the light gauge shape sheet steel for a steel house, the productivity of the light gauge shape sheet steel for a steel house is generally reduced by the facts that (i) the work of opening the fastening holes for connecting the members is one factor reducing the productivity, (ii) the shape steel has different types including the general member, the application member and the special member, and especially the existence of "the special member" is a factor reducing the working efficiency of the conventional production equipment and the conventional production control system, (iii) the necessity of opening a multiplicity of fastening holes requires long time and a great amount of labor to fetch the information on the fastening holes such as the position, the shape and the machining accuracy of the fastening holes in the design stage, as the member control information for the production control system, and (iv) the information on the positions of the fastening holes to be formed are complicated. Thus, another object of the present invention is to solve the problems (i), (ii), (iii) and (iv) described above.

Further, houses and other buildings are generally built individually by reflecting the propensity of each customer. Therefore, the design drawing, the working drawing, the material order and the like construction information prepared at the time of constructing a building are rarely reused. In recent years, the extension of ownership of prefabricated houses has increased the chance of reusing the building information in the same company. For the reasons explained below, however, the building information are not generally reused between different companies.

(a) The standards of the members making up a building are not shared by companies.

(b) The building information is rarely reused as it is, and correction to some degree is required. The manner in which the building information is stored varies from one company to another. Especially, the building information which may be stored in the form of paper media cannot be easily corrected.

(c) Conventionally, the building information are not very helpful to both the party providing them and the party using them, and therefore are not extensively used by other companies.

On the other hand, the building materials and the construction methods of a steel house can be easily shared and the building information on them can be distributed among a plurality of companies. Nevertheless, companies generally do not construct a building by reusing the building information of another building constructed by another company.

Another object of the present invention is to solve these problems of the prior art and to provide a building information distribution aiding system for distributing the building information through a network.

The entire disclosures of the references cited herein are incorporated herein by reference.

SUMMARY OF THE INVENTION

According to the present invention, an information processing system is provided for producing a building material. The system includes a design drawing generating arrangement for generating the design drawing information on an objective building, a list generating arrangement for generating the list information of members used for the objective building, based on the design drawing information obtained by the design drawing generating arrangement, and a member production control arrangement for controlling the production of the members used for the objective building, based on the list information obtained by the list generating arrangement.

For example, in order to efficiently produce the members such as light gauge shape sheet steel for a building or especially a steel house, the light gauge shape sheet steel for a steel house is produced by the CAD system and the CAN system, e.g., systems for assisting in controlling the preparation for production such as the process design, the work design and the NC (numerically controlled) programming and the production process such as machining and assembly, in such a manner that the design drawings, including a wall panel drawing, a floor panel drawing and a roof truss drawing, of a low building are first generated on a computer. The specification and quantity of the light gauge shape sheet steel can be determined from these design drawings. Based on these drawings, a steel member order list may be prepared, and based on this steel member order list information, the light gauge shape sheet steel can be produced under a control of a computer.

According to an exemplary embodiment of the present invention, the specification and the quantity of the light gauge shape sheet steel are automatically determined from the design drawing information of a steel house, and based on them, a steel member order list is automatically output. Therefore, the material (steel member) totaling work required for producing the light gauge shape sheet steel which has conventionally been conducted manually may be eliminated, either fully or to the large extent. As a result, not only the transfer error is substantially eliminated, the whole work can be significantly simplified, and at the same time, the complicated desk work for ordering steel members may be reduced.

In addition, in view of the fact that the light gauge shape sheet steel is produced using the information of the specification and the quantity input to the computer, the light gauge shape sheet steel can be supplied accurately, rapidly and at low cost. Further, in case of a need of a design change for some reason or other, the specification, the quantity and the contents of the order for the light gauge shape sheet steel are automatically corrected very efficiently by correcting the original design drawing information.

The light gauge shape sheet steel includes members formed of shape steel using the sheet steel having a thickness not less than 0.4 mm but less than 2.3 mm and fittings and hardware.

Also, the specification of the light gauge shape sheet steel includes the product standard, length and the quantity of the members and the member positioning information for assembling the members.

The specification of the light gauge shape sheet steel includes the member positioning information for assembling the members. Thus, the risk of machining a member for positioning not conforming with the design drawing is eliminated, and it is possible to machine the light gauge shape sheet steel efficiently. The "member positioning information" (position machining information) generally includes information for determining the relative positions of the members being assembled such as the positions of the bolt holes for assembling the members, and the notching and embossing, and the like.

Further, by calculating the specification and the quantity of the light gauge shape sheet steel for each panel used for a low building, the light gauge shape sheet steel preferred for assembling a panel can be easily specified, thereby making efficient assembly work possible. The "panel" (predetermined unit member) generally includes a wall panel and a floor panel configured of a plurality of the light gauge shape sheet steel combined with one another.

Further, according to another embodiment of the present invention, a production equipment is provided for producing the light gauge shape sheet steel for a steel house by supplying flat steel on a main production line. The production line includes an uncoiler, a leveler arranged downstream of the uncoiler, an end portion cutter arranged downstream of the leveler, a waiting table arranged downstream of the end portion cutter, a stationary fastening hole forming machine arranged downstream of the waiting table and a roll forming machine arranged downstream of the stationary fastening hole forming machine. In particular, the equipment includes a non-stationary fastening hole forming machine for forming the fastening holes without stopping the flow of the sheet steel is arranged downstream of the leveler independently of the stationary fastening hole forming machine.

Further, according to another embodiment of the present invention, a computer-controlled production control system is provided for producing light gauge shape sheet steel for a steel house configured of a general member of the basic structure, an application member having only the shape of the end portion thereof different from that of the general member and a special member requiring a special machining process, by a production equipment for producing the light gauge shape sheet steel for a steel house, comprising a main production line including an uncoiler, a leveler arranged downstream of the uncoiler, an end portion cutter arranged downstream of the leveler, a waiting table arranged downstream of the end portion cutter, a stationary fastening hole forming machine arranged downstream of the waiting table and a roll forming machine arranged downstream of the stationary fastening hole forming machine, and a special production line arranged in parallel to the main production line. Using the control system, based on the member control information of the production control system, the general member, the application member and the special member can be discriminated in the step preceding to the leveler. The general member and the application member can be produced on the main production line, while the special member, after being machined through the machining steps shared by the general member and the application member on the main production line, is moved onto the special production line different from the main production line, and after being machined to a unique shape, returned to the main production line.

In the stationary fastening hole forming machine, the production efficiency is reduced due to the fact that the fastening holes are formed by stopping the sheet steel temporarily during the line assembly work to form the fastening holes in the work with high accuracy. In the non-stationary fastening hole forming machine, the fastening holes can be formed in the moving sheet steel. Thus, the production efficiency can be improved, although the accuracy with which the fastening holes are formed is reduced as compared with the stationary fastening hole forming machine.

As described herein, the fastening holes formed in the light gauge shape sheet steel of a steel house can be classified into holes of a high accuracy and generally not depending on the position and purpose of the individual holes. According to the present invention, based on this point, the fastening holes which do not need to have high accuracy are produced by the non-stationary fastening hole forming machine on the main production line, and those holes that should be of high accuracy by the stationary fastening hole forming machine thereby to improve the productivity. By employing this production control system, the production efficiency of the whole production line of the light gauge shape sheet steel of a steel house including the general member, the application member and the special member can be improved.

In contrast with prior art, according to the present invention, in designing a steel house with the CAD system, the information including the positions, shape and the machining accuracy of the fastening holes can be automatically generated in accordance with the attributes of the individual members, and the fastening hole information thus generated are fetched into the member control information. In this manner, a multiplicity of fastening hole information are efficiently obtained automatically at the same time as the building design, so that the member control information of the production control system can be generated.

Also, according to the present invention, the shape of the shape steel is developed into a flat form, and the fastening hole position information is controlled one-dimensionally along the length of the members of each portion of the developed shape steel, so that the process of forming the fastening holes is easily controlled, thereby making it possible to secure the versatility of the data.

Further, according to the present invention, a building information distribution aiding system is provided. The system includes a server arrangement for providing a building information distribution site for distributing the building information of buildings having a common standard of the material and the construction method, and a client arrangement connectable with the server arrangement through a network. The system further comprise a first arrangement which allows the server arrangement to list actual cases of buildings, a second arrangement allowing the client arrangement to select at least one of the actual cases listed in the case collection page, and a third arrangement allowing the building information corresponding to the selected actual case to be downloaded into the client arrangement.

BRIEF DESCRIPTION OF THE DRAWINGS

Preferred embodiments of the invention are explained below with reference to the accompanying drawings, in which:

FIG. 4 is a diagram for explaining a screen (a screen for setting the cross section, etc. of the light gauge shape sheet steel) of the display unit of the information processing system shown in FIG. 1;

FIG. 19 is a diagram for explaining a screen (a screen showing the state in which the shape steel production data are automatically totaled) of the display unit of the information processing system shown in FIG. 1;

FIG. 24A is a sectional view of the shape steel for explaining a system for controlling the fastening hole position information of the shape steel as one-dimensional information;

FIG. 24B is a development of the shape steel for explaining a system for controlling the fastening hole position information of the shape steel as one-dimensional information;

FIG. 25 is a schematic diagram showing the general member, the application member and a particular member according to an exemplary embodiment of the present invention;

FIG. 26 is a schematic diagram showing a computer-controlled production control system for the light gauge shape sheet steel for a steel house according to an exemplary embodiment of the present invention;

FIG. 30 is a flowchart showing the process executed by the server and the client to sell new building information in the building information distribution aiding system according to an exemplary embodiment of the present invention.

DETAILED DESCRIPTION

Exemplary embodiments of the invention are explained below with reference to the drawings.

Figure 1:
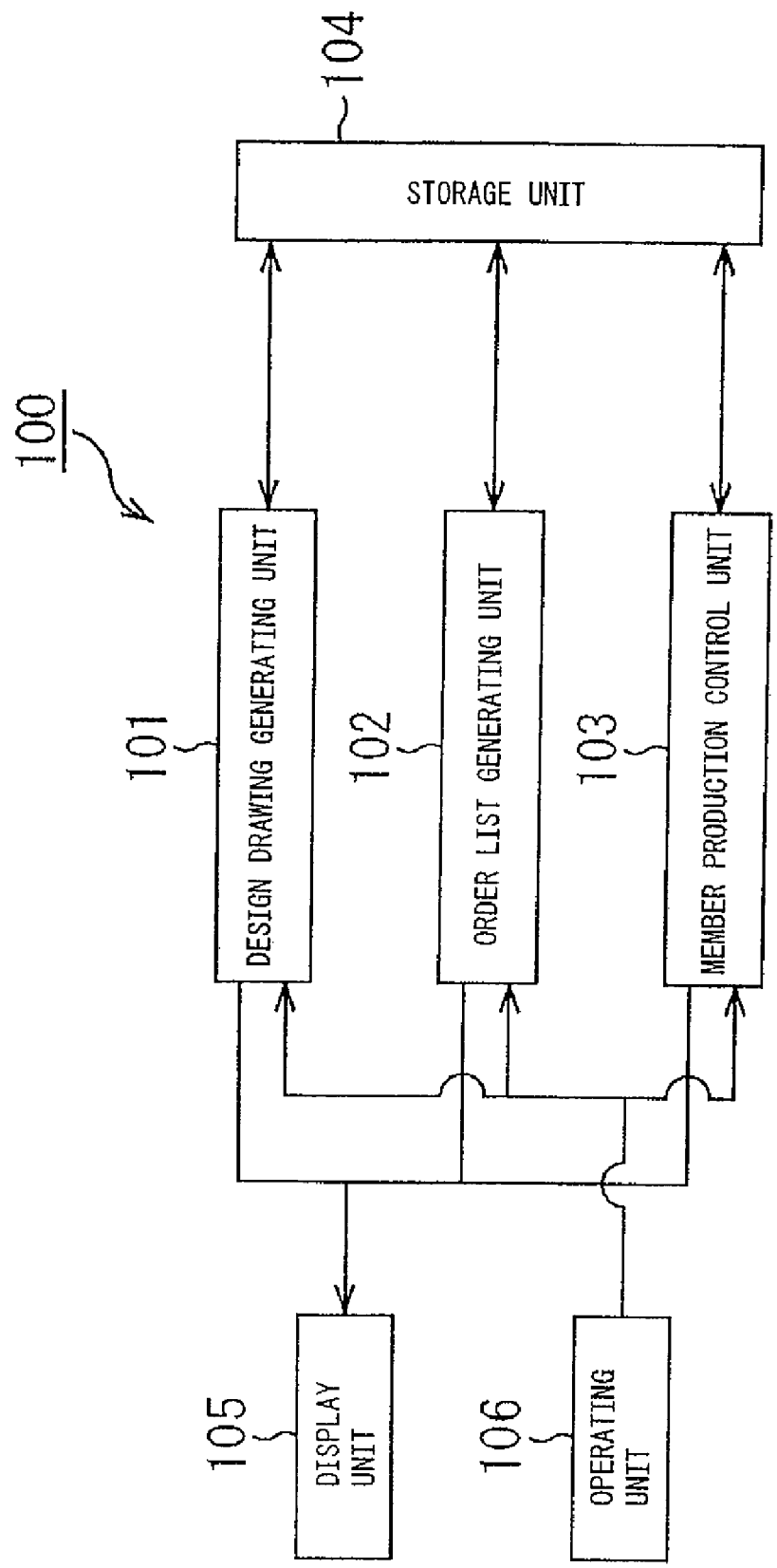
FIG. 1 is a block diagram showing an information processing system according to a preferred embodiment of the present invention.

Referring to FIG. 1, an information processing system 100 according to an exemplary embodiment of the present invention can be used for efficiently producing the light gauge shape sheet steel for a steel house, and comprises a design drawing generating unit 101, an order list generating unit 102, a member production control unit 103, a storage unit 104, a display unit 105 and an operating unit 106.

Figure 2:
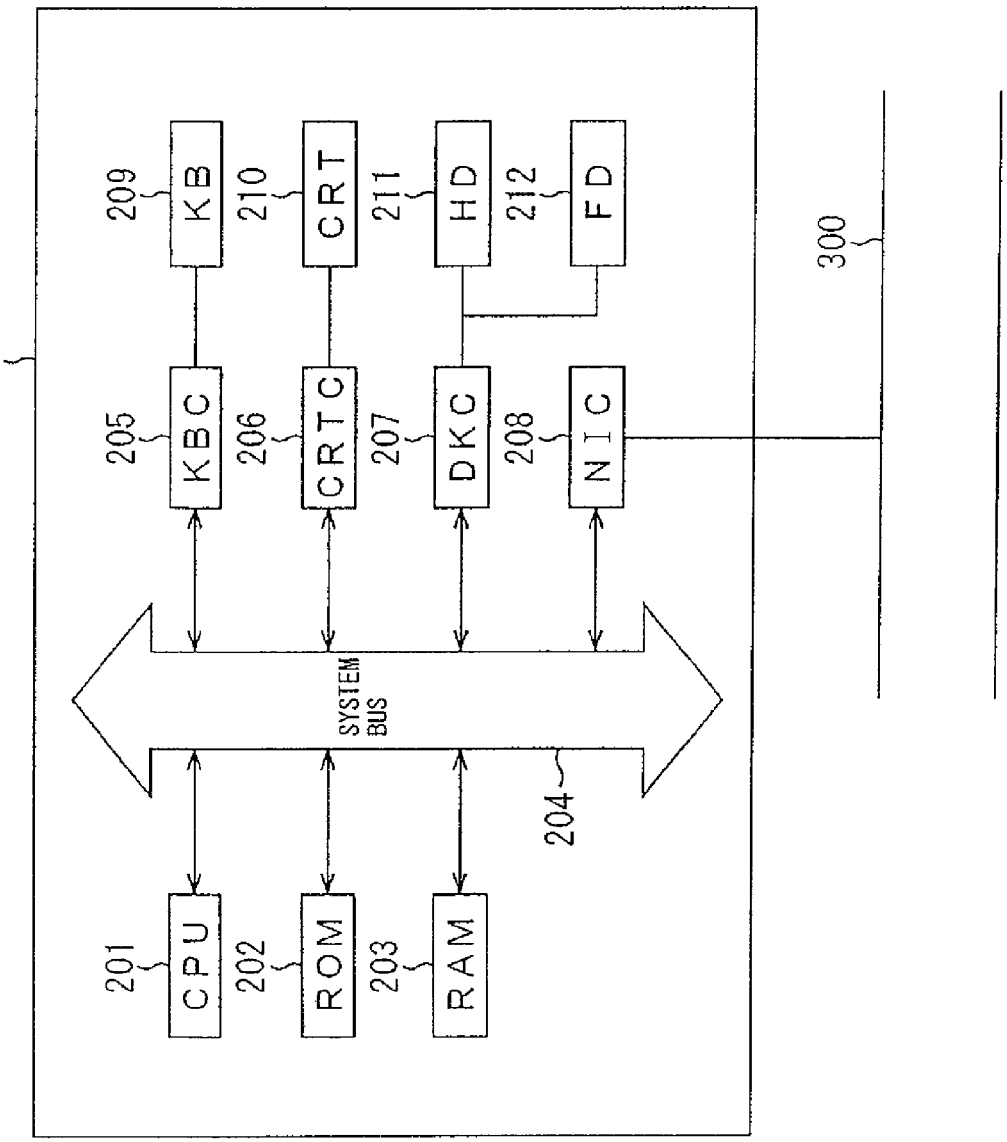
FIG. 2 is a block diagram showing a hardware configuration of the information processing system of FIG. 1.

FIG. 2 shows a block diagram of a hardware configuration of the information processing system 100, the information processing system 100 can be implemented by, for example, a computer 200.

The computer 200, as shown in FIG. 2, comprises a CPU 201, a ROM 202, a RAM 203, a keyboard controller (KBC) 205 of a keyboard (KB) 209, a CRT controller (CRTC) 206 of a CRT display (CRT) 210, a disk controller (DKC) 207 for a hard disk (HD) 211 and a flexible disk (FD) 212, and a network interface card (NIC) 208 of an arbitrary network 300. These component parts are interconnected in a communicable manner.

The CPU 201 controls the component parts connected to a system bus 204 by executing the software stored in the ROM 202 or the HD 211 or the software provided from the FD 212. Specifically, the CPU 201 reads and executes a processing program conforming with a predetermined processing sequence from the ROM 202 or the HD 211 or the FD 212. Especially, the CPU 201 implements the design drawing generating unit 101, the order list generating unit 102 and the member production control unit 103 shown in FIG. 1.

The RAM 203 functions as a main memory or a work area for the CPU 201.

The DKC 207 controls the access to the HD 211 and the FD 212 storing a boot program, various applications, an editing file, a user file and a predetermined processing program for executing the functions of this embodiment.

The storage unit 104 shown in FIG. 1 includes the RAM 203, the ROM 202, the hard disk (HD) 211, the flexible disk (FD) 212 and the disk controller (DKC) 207, and stores such data as the basic design drawing (design drawing, etc.) for a steel house, in addition to the various processing programs.

The KBC 205 controls the input from the input devices such as the KB 209 and a pointing device (not shown for the sake of clarity). The operating unit 106 shown in FIG. 1 includes the KB 209 and the KBC 205.

The CRTC 206 controls the display of the CRT 210. The display unit 105 shown in FIG. 1 includes the CRT 210 and the CRTC 206.

The NIC 208 exchanges data interactively with the devices or the systems on the network 300.

The information processing system 100 according to this embodiment is configured so that the light gauge shape sheet steel for a steel house can be efficiently produced. In order to conform with steel houses of various designs, the light gauge shape sheet steel and the panel are required to be designed and produced independently for each building. Also, by opening and accurately setting in position the fastening holes in the light gauge shape sheet steel and assembling the members, the steel house can be constructed most efficiently with high accuracy.

The light gauge shape sheet steel for a steel house configured of sheet steel having a thickness of no less than 0.4 mm but less than 2.3 mm, for example, can be efficiently and accurately produced with a roll forming machine or a turret punching machine controlled by the CAM system. This, the fastening holes can be opened at more accurate positions.

Accordingly, in the information processing system 100 according to this exemplary embodiment of the present invention, the design drawing generating unit 101, the order list generating unit 102 and the member production control unit 103 shown in FIG. 1 are such that the information obtained in the CAD system is operatively interlocked with the CAM system by designing the panel drawing (design drawing) for each building by the CAD system and burying the information such as the shape and the fastening holes of each light gauge shape sheet steel in the information (design drawing information) of the panel drawing. As a result, the productivity of the steel house can be improved.

Figure 3:
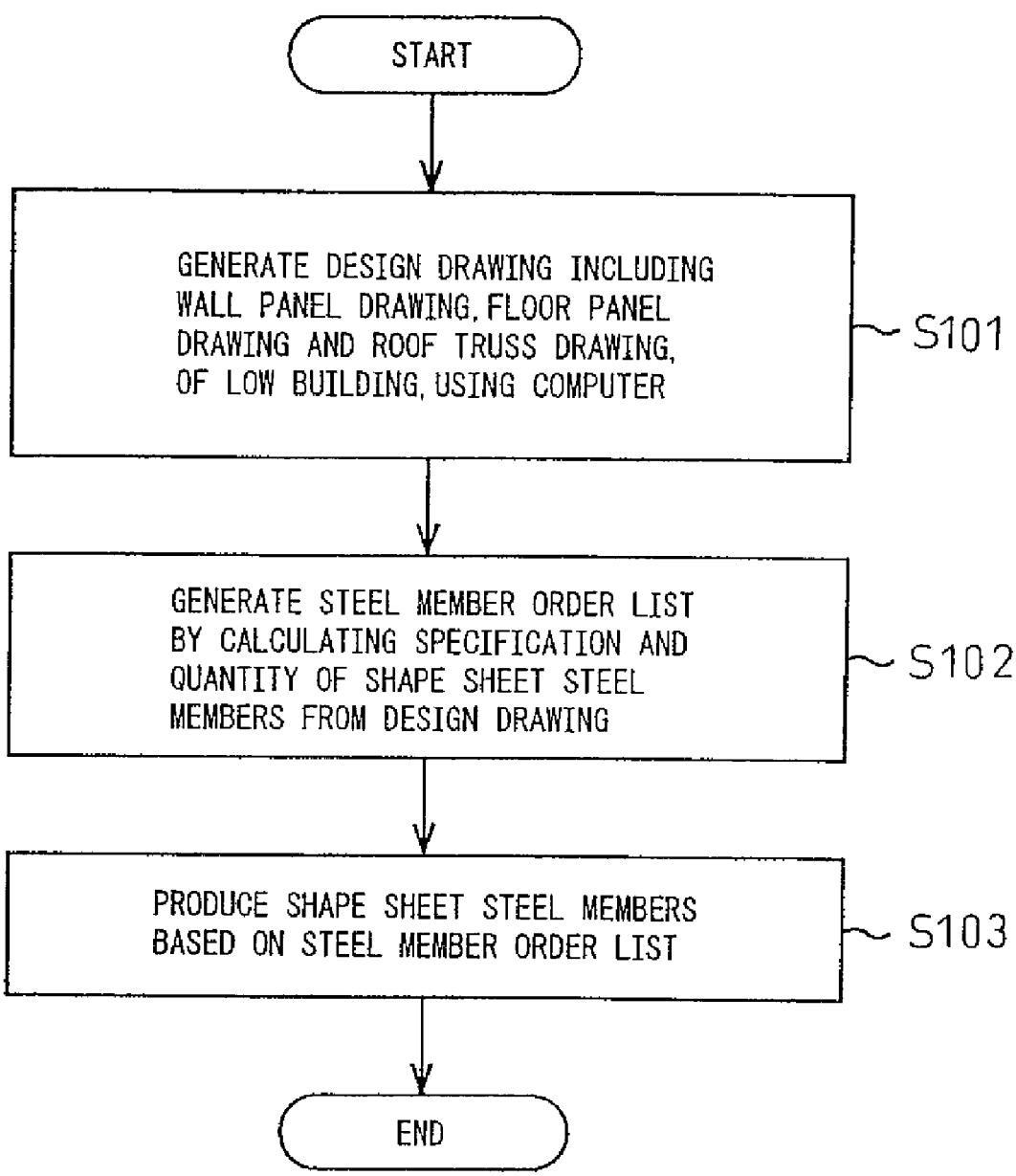
FIG. 3 is a flowchart for explaining the operation of the information processing system of FIG. 1.

The CPU 201 of the computer 200 executes the processing program in accordance with the flowchart of FIG. 3. As a result, the information processing system 100 operates as follows:

Step S101: The design drawing generating unit 101, based on the information input from the user by the CAD system using the computer 200, generates design drawings including a wall panel drawing, a floor panel drawing and a roof truss drawing for a steel house using the information stored beforehand in the storage unit 104.

The CAD system includes modules for producing the working drawings for three portions including the wall panel, the floor panel and the roof truss member making up the steel house, and each of the working drawing generating modules executes the following steps:

(1) The step of designing the plan view and calculating the proof stress of the steel house.
(2) The step of determining the shape of the cross section of the light gauge shape sheet steel constituting the wall panel and the floor panel.
(3) The step of determining the arrangement and the openings of the wall panel of the steel house.
(4) The step of automatically generating a working drawing (panel working drawing) of a plurality of the wall panels and the floor panels making up the steel house while, at the same time, automatically calculating the specification information of the light gauge shape sheet steel required for production of each wall panel and each floor panel.

Such CAD system has registered therein the layout of each light gauge shape sheet steel making up a given panel, the dimensional correction of the joint of each light gauge shape sheet steel and the logic about the position of the fastening holes of each light gauge shape sheet steel. The user determines the shape of the light gauge shape sheet steel used, by the CAD system, and generates a panel layout diagram (see FIG. 9). In this way, each panel working drawing (see FIG. 10) and the production data of the shape steel and the hardware (order list information, see FIG. 19) are automatically prepared.

The CAD system has a member totaling module in addition to the three working drawing generating modules including the wall panel, the floor panel and the roof truss member making up the steel house as described above.

The wall panel drawing generating module is such that:
(1) Once the information on the cross section (information including the fastening hole information) of the light gauge shape sheet steel making up the wall panel is set by the user (FIG. 4) and the position of the wall line and the opening size are input as shown in the design drawing (FIG. 5), predetermined light gauge shape sheet steel is automatically produced based on the information from the user.
(2) By dividing the wall line by panel, the gaps between the light gauge shape sheet steel and the panels required for the panel boundary are automatically generated.
(3) Based on the steel house construction method, anchor bolts and band metal are automatically generated. In the process, the fastening hole information is input to those portions of the upper and lower frames of the wall panel which interfere with the anchor bolts.
(4) After completely arranging the light gauge shape sheet steel, the dimensions of the joint portion of the light gauge shape sheet steel are corrected in a single collective operation.

The floor panel drawing generating module is such that:
(1) The cross section information (information including the fastening hole information) of the light gauge shape sheet steel making up the floor panel is set by the user and, at the time when the range of the floor panel is designated as in the design drawing, the light gauge shape sheet steel making up the floor panel are automatically generated. At the same time, the dimensions of the joints of the light gauge shape sheet steel are also corrected,
(2) In the case where other floor panels are arranged adjacently, the gaps between the panels and the light gauge shape sheet steel newly required are automatically generated based on the steel house construction method.
(3) The ties are automatically arranged based on the steel house construction method.

Figure 15:
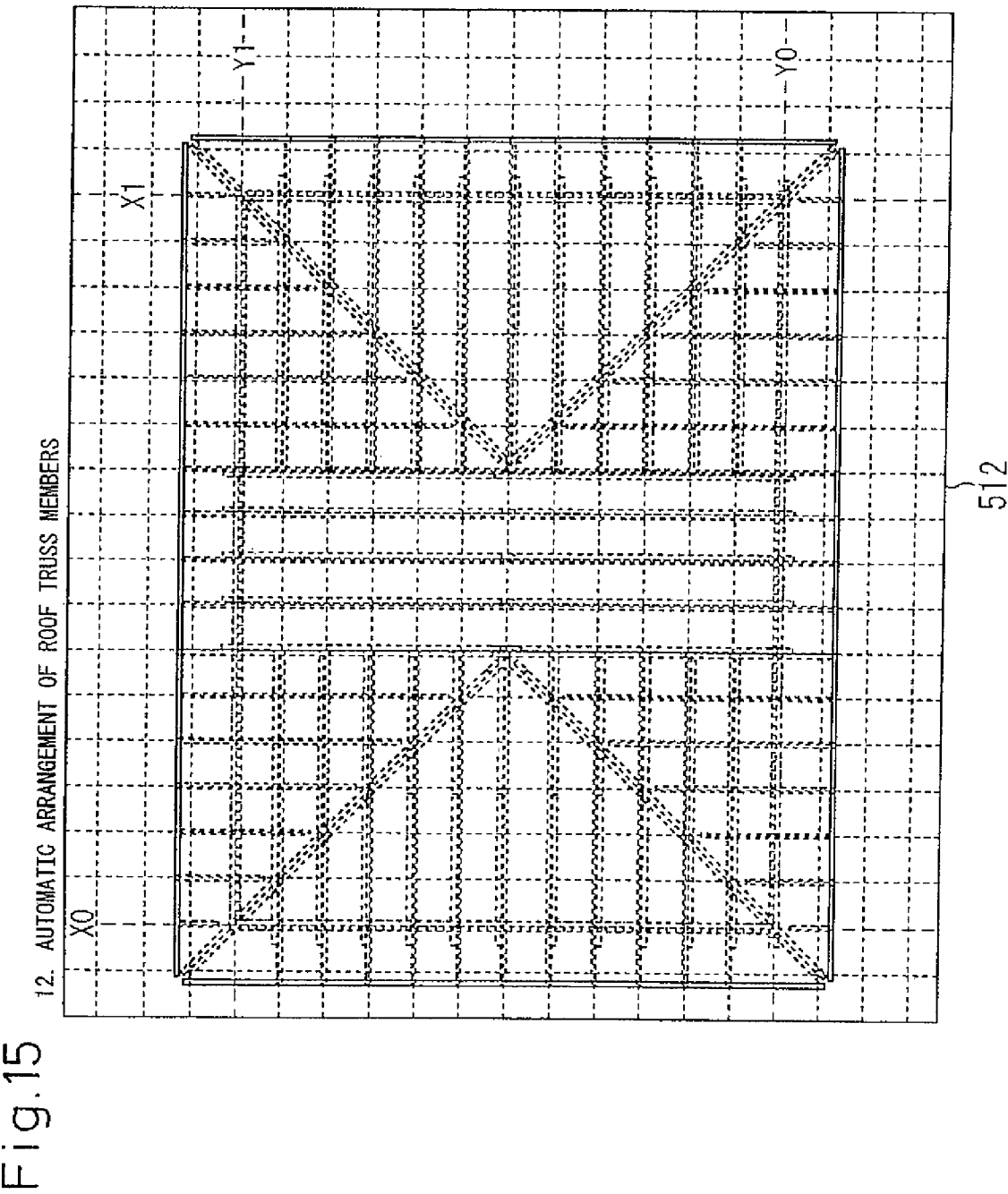
FIG. 15 is a diagram for explaining a screen (a screen showing the state in which the roof truss members are automatically arranged) of the display unit of the information processing system shown in FIG. 1.
Figure 16:
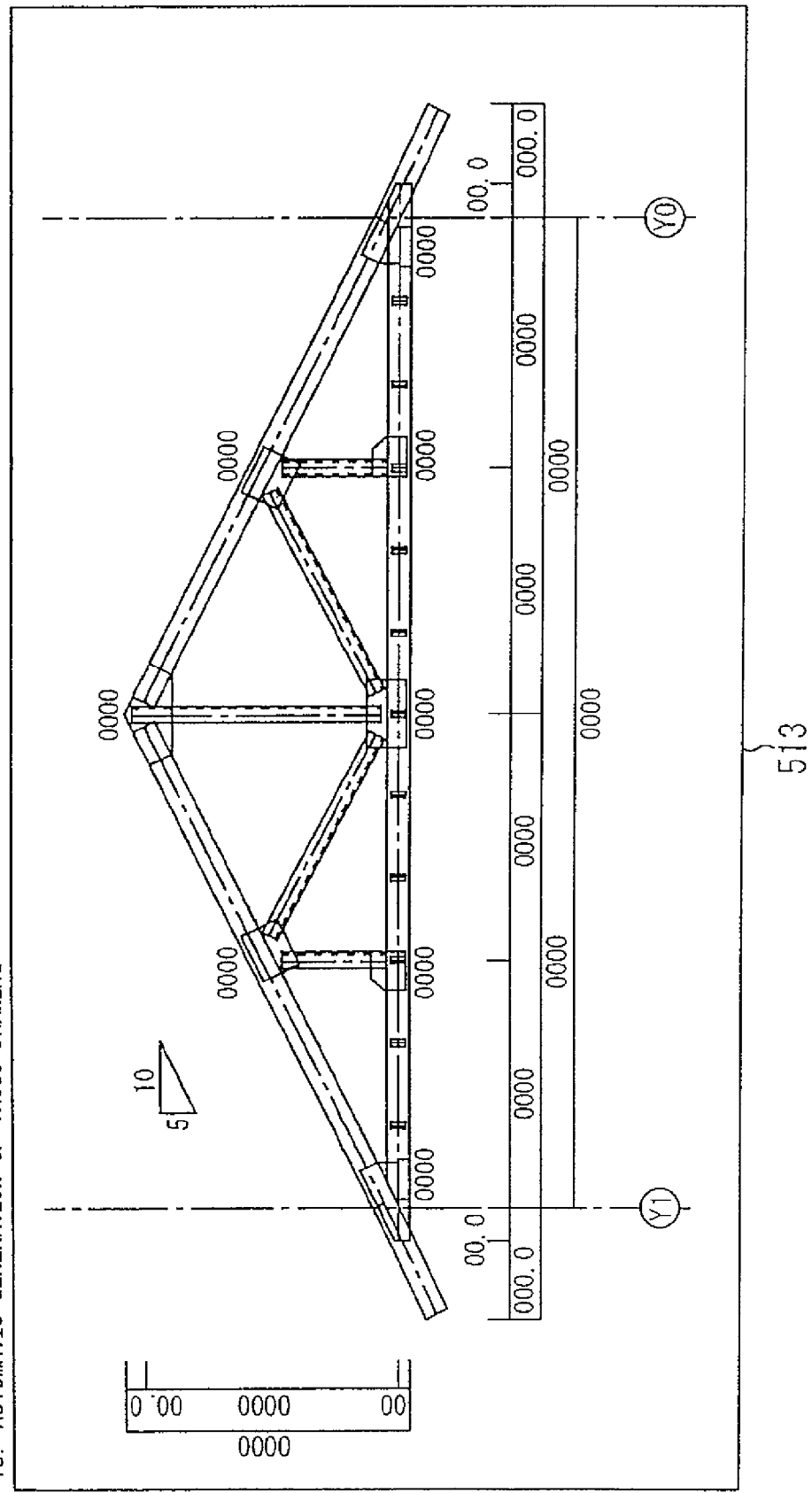
FIG. 16 is a diagram for explaining a screen (a screen showing the state in which the truss drawing is automatically prepared) of the display unit of the information processing system shown in FIG. 1.

The roof truss drawing generating module is such that:
(1) When the roof gradient, the span and the extension of the eaves in addition to the cross section of the light gauge shape sheet steel used are set by the user (FIG. 4), the light gauge shape sheet steel is automatically produced based on the designation of the truss position and the range of the hip roof and the gable.
(2) with regard to the truss and the rafter, the members are connected by bolts to each other, and the fastening hole information are input predetermined positions of the particular members based on the steel house construction method (FIGS. 15 and 16).
(3) After complete arrangement of the light gauge shape sheet steel, the dimensions of the joints of the light gauge shape sheet steel are corrected in a collective operation.

In the stage where the information is completely generated by the function as described above, the member totaling module automatically totals, by cross section or length, the information including the shape, length, quantity, hole shape and the hole position (design drawing information) of all the light gauge shape sheet steel used for the steel house existing in the CAD system. Based on this total, an order list (steel member order list) is prepared (FIG. 19).

Step S102: The order list generating unit 102 totals the specification and the quantity of the light gauge shape sheet steel making up the steel house from the design drawing information obtained in the design drawing generating unit 101 by the member totaling module of the CAD system described above, and based on them, an order list (steel member order list) is generated.

Step S103: The member production control unit 103 produces the light gauge shape sheet steel by the CAM system based on the steel order list information obtained in the order list generating unit 102. More specifically, the member production control unit 103, for example, converts the steel member order list information obtained in the order list generating unit 102 to the data (control data) for operation control of the equipment (member production machine) for producing the light gauge shape sheet steel and supplies these control data to the member production machine. As a result, the member production machine starts to produce the designated light gauge shape sheet steel.

FIGS. 4 to 20 show examples of screens (the screens due to the CAD/CAM systems) displayed on the display unit 105 by the process up to the production of the light gauge shape sheet steel from the aforementioned design in the information processing system 100 according to this exemplary embodiment of the present invention.

The operation in accordance with the display on each screen of the display unit 105 shown in FIGS. 4 to 19 and the manipulation (manipulation by mouse, etc.) of the user on the screen are controlled by the CPU 201 of the computer 200 shown in FIG. 2.

1. Setting Screen 501 for Cross Section, Etc. of Light Gauge Shape Sheet Steel (FIG. 4)

The setting screen 501 is configured so as to set the cross section, etc. of the light gauge shape sheet steel automatically arranged. For example, based on the design drawing, etc. of the steel house stored beforehand in the storage unit 104, the desired one of the information on the cross section (the cross section conforming with a predetermined standard) of the light gauge shape sheet steel also stored in advance in the storage unit 104 can be selectively set. Therefore, the light gauge shape sheet steel set on the setting screen 501 are automatically arranged as shown on the screen 506, etc. of FIG. 6 described herein below.

Figure 5:
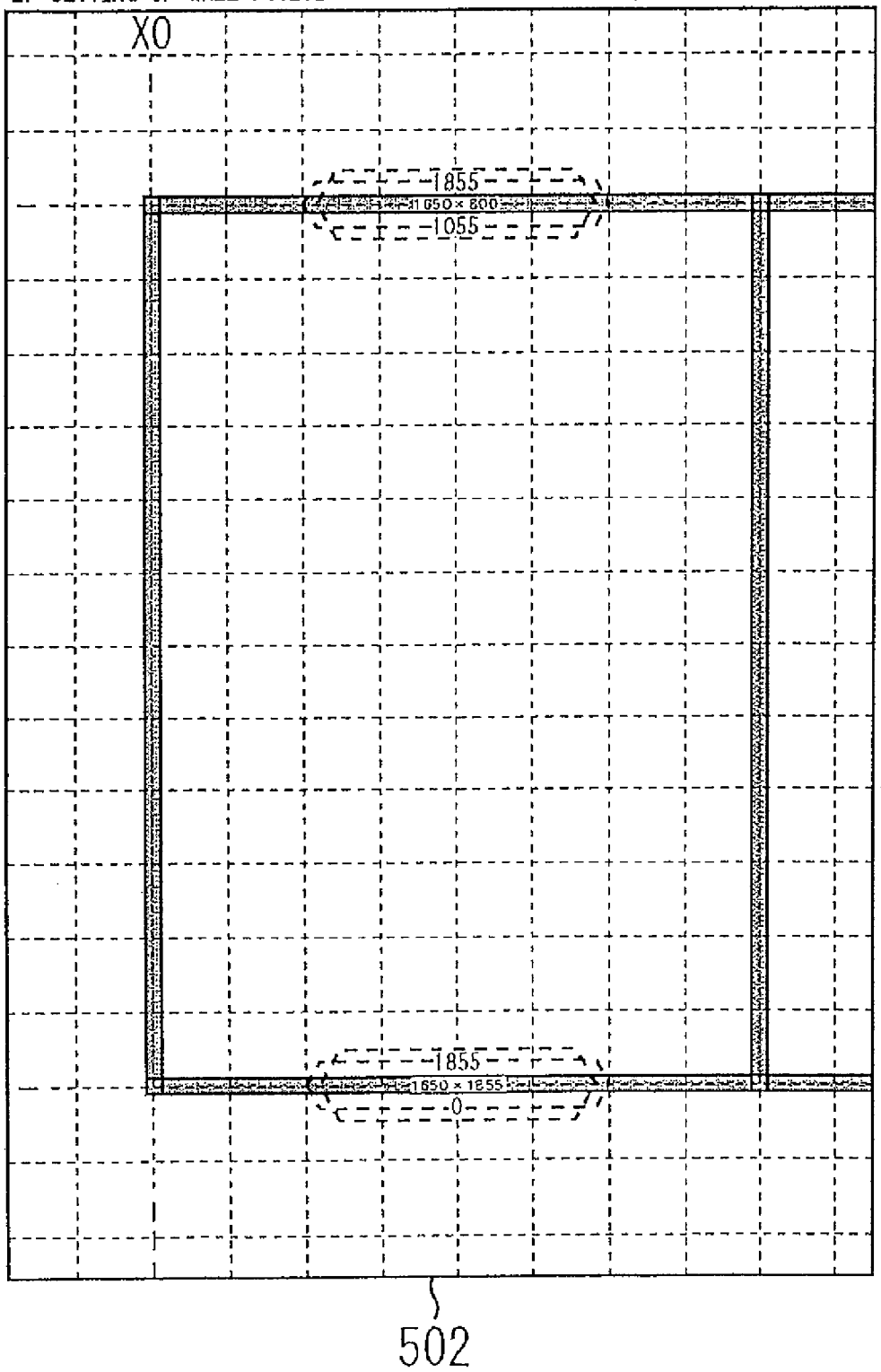
FIG. 5 is a diagram for explaining a screen (a screen for setting the wall position and the positions of openings (opening size)) of the display unit of the information processing system shown in FIG. 1.

2. Setting Screen 502 for Wall Position and Opening Position (Opening Size) (FIG. 5)

The setting screen 502 is configured so that the positions of the wall and the openings can be set. This setting is carried out based on the design drawing data, etc. of the steel house stored in advance in the storage unit 104.

3. Screen 503 Showing the State of Light Gauge Shape Sheet Steel Automatically Arranged (FIG. 6)

On the screen 503, the state of the light gauge shape sheet steel automatically arranged with regard to the wall portion is displayed based on the setting on the setting screen 501 and the setting screen 502.

4. Screen 504 Showing the State of the Wall Divided into Panels (FIG. 7)

Figure 6:
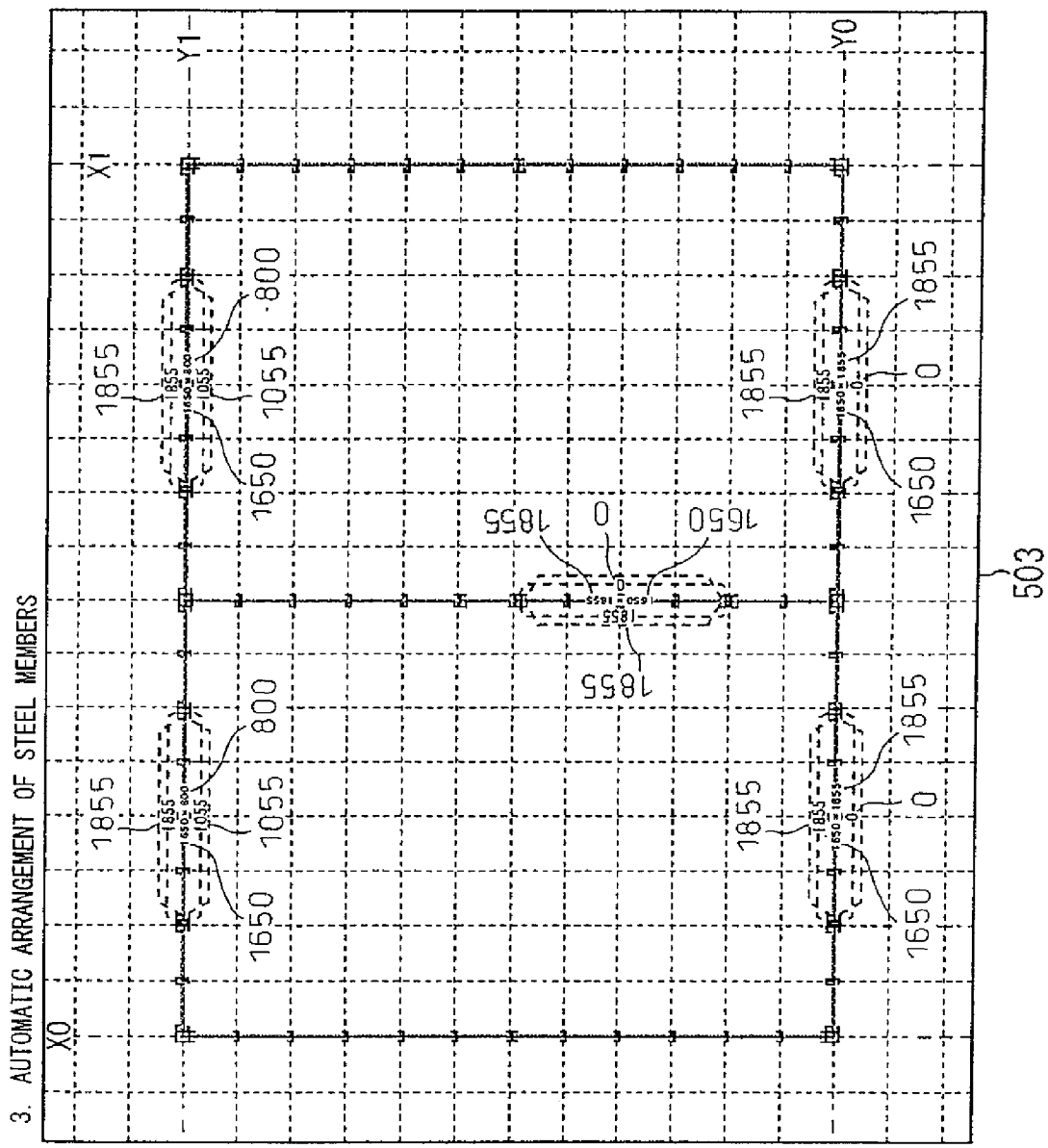
FIG. 6 is a diagram for explaining a screen (a screen showing the state in which the light gauge shape sheet steel are automatically arranged) of the display unit of the information processing system of FIG. 1.

On the screen 504, the light gauge shape sheet steel automatically arranged with respect to the wall, shown on the screen 503 of FIG. 6, is displayed as a panel (wall panel) as a configuration combining the particular light gauge shape sheet steel.

5. Screen 505 Showing the State of Hardware Automatically Arranged (FIG. 8)

Figure 7:
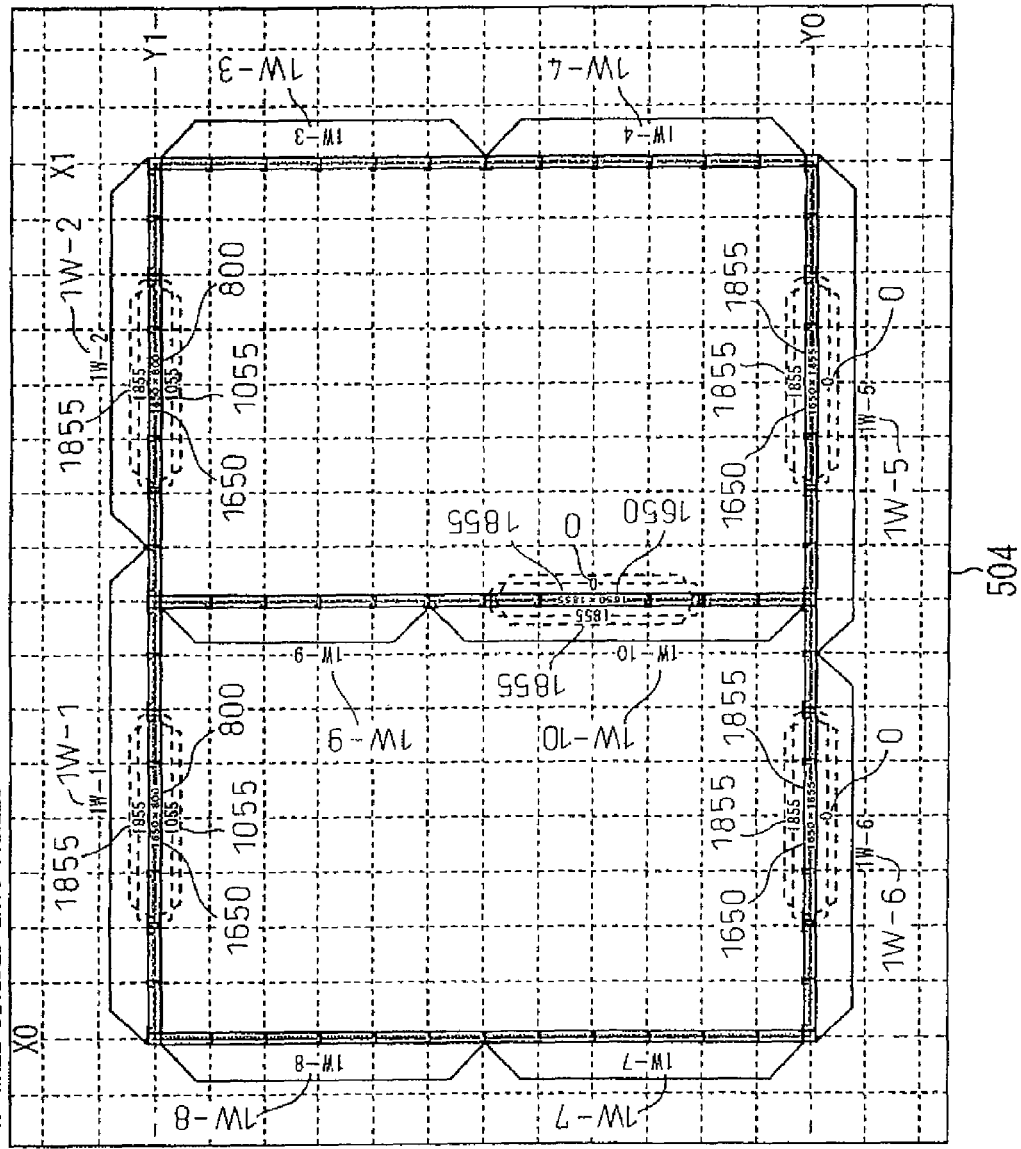
FIG. 7 is a diagram for explaining a screen (a screen showing the state of the wall divided into panels) of the display unit of the information processing system of FIG. 1.

On the screen 505, the state in which the panel-to-panel joint (hardware position) automatically arranged by combining a plurality of light gauge shape sheet steel on the screen 504 of FIG. 7 is displayed.

6. Screen 506 Showing the State in which the Plan View is Automatically Generated (FIG. 9)

Figure 8:
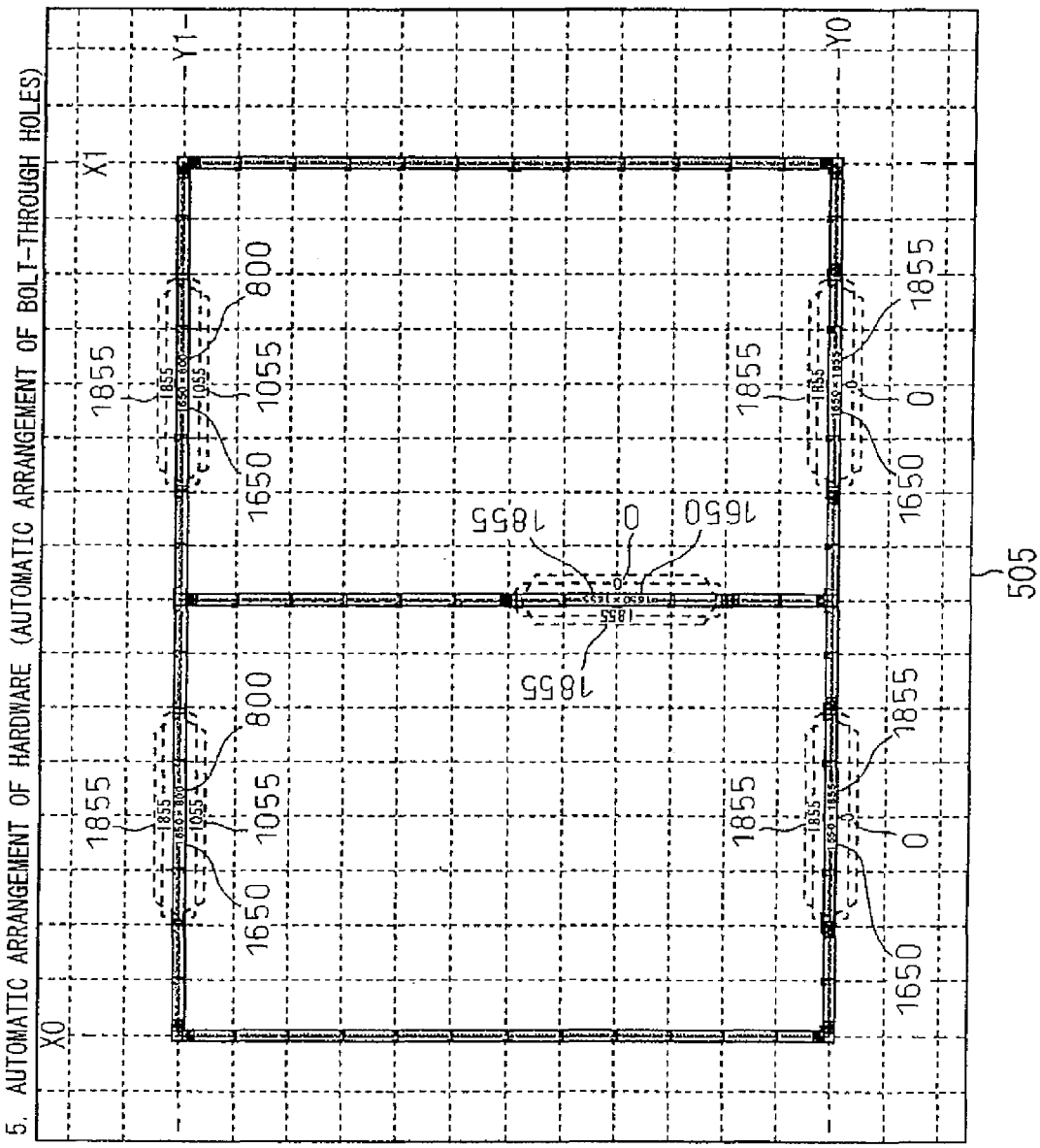
FIG. 8 is a diagram for explaining a screen (a screen showing the state of hardware arranged automatically) of the display unit of the information processing system shown in FIG. 1.

On the screen 506, the layout of the panels automatically generated based the wall panel state shown on the screen of FIG. 7 and the hardware position shown on the screen 505 of FIG. 8 is displayed.

Figure 10:
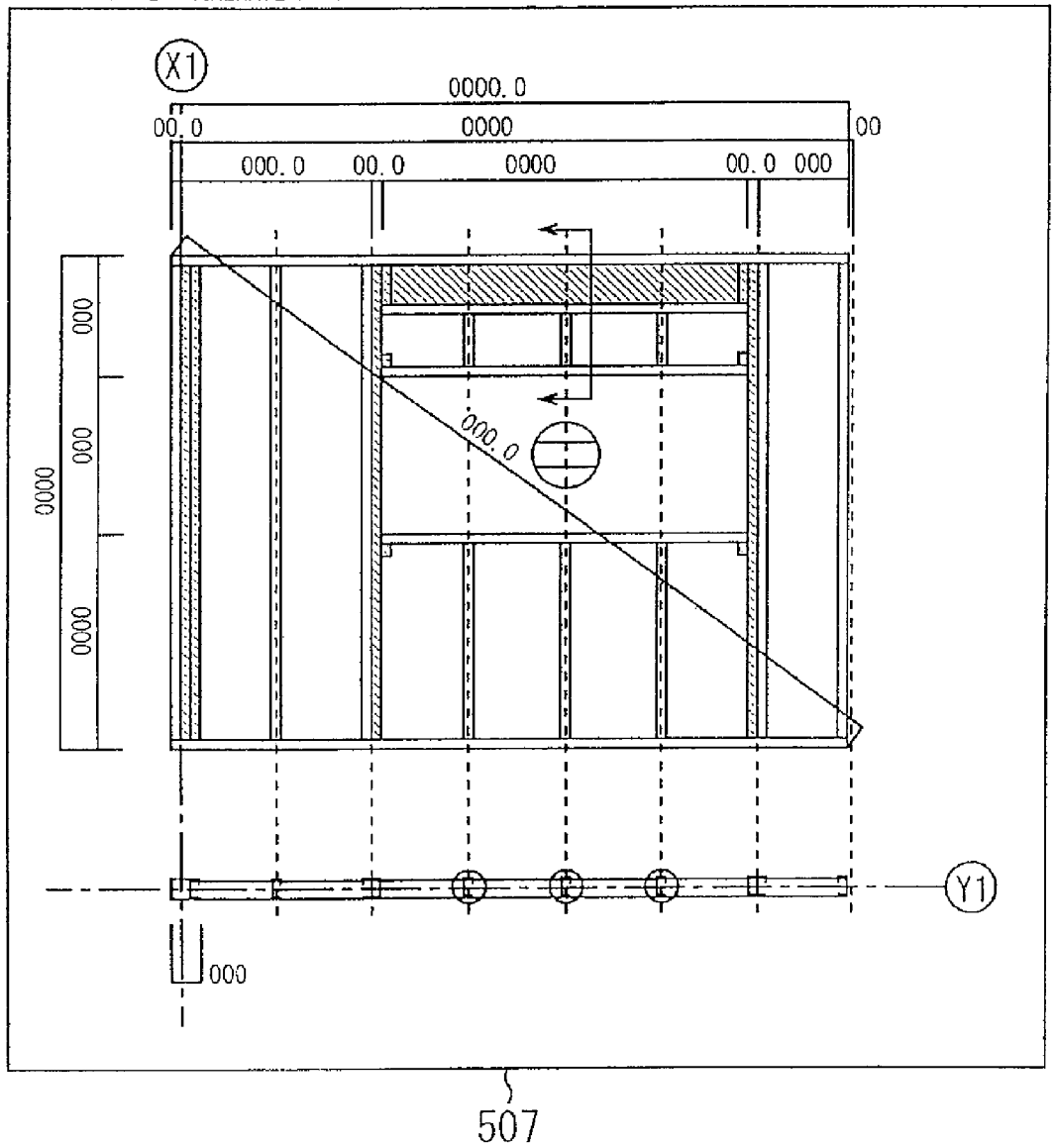
FIG. 10 is a diagram for explaining a screen (a screen showing the state in which each panel drawing is automatically prepared) of the display unit of the information processing system shown in FIG. 1.

7. Screen 507 Showing the State in which Each Panel Drawing is Automatically Generated (FIG. 10)

Figure 9:
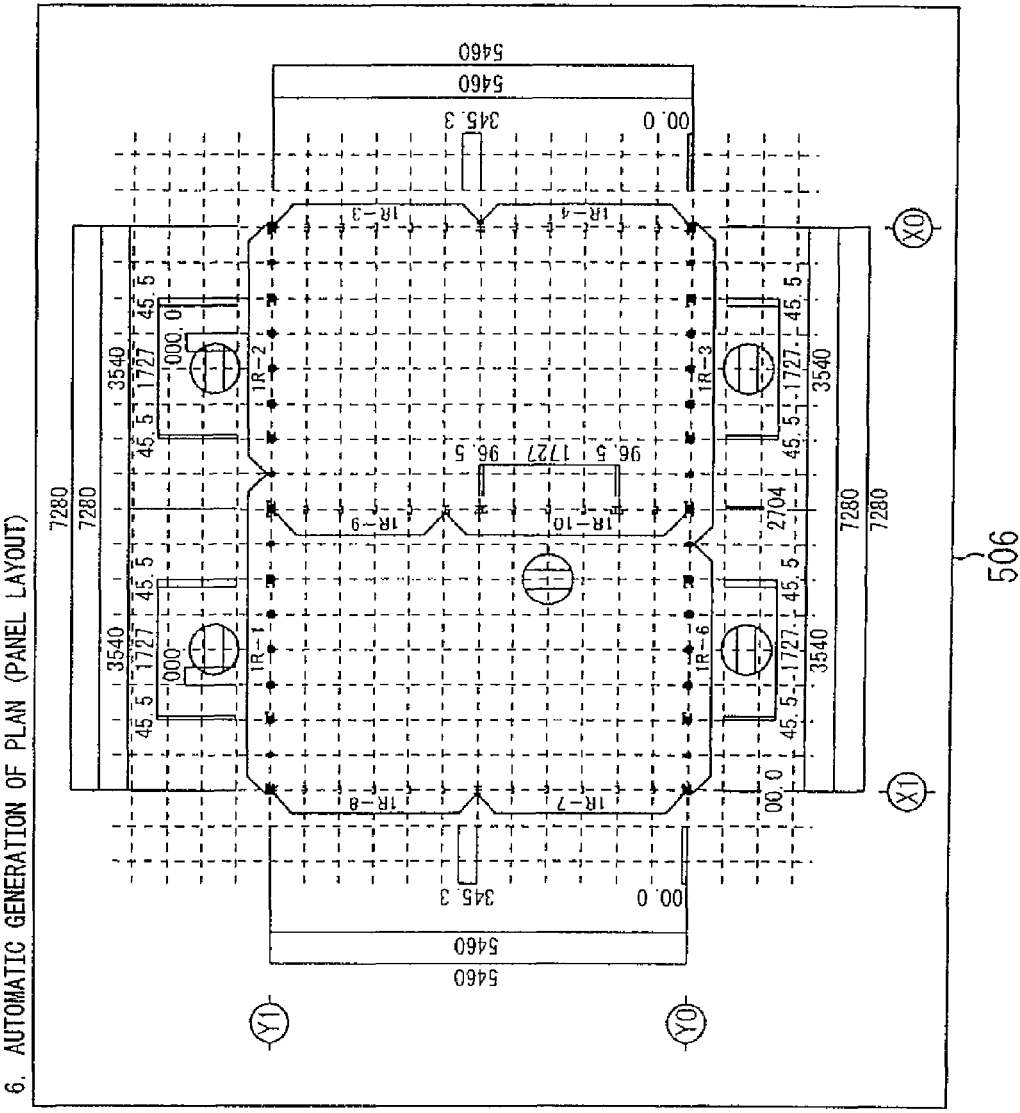
FIG. 9 is a diagram for explaining a screen (a screen showing the state in which a plan view is automatically prepared) of the display unit of the information processing system shown in FIG. 1.

On the screen 507, a panel drawing (the drawing showing the layout, etc. of the members conforming with the opening size) automatically generated for each panel in the panel layout drawing shown on the screen 506 of FIG. 9 is displayed.

8. Setting Screen 508 of Assignment Area of Each Floor Panel (FIG. 11)

The screen 508 is so configured that the assignment area of the panels (floor panels) configured by combining the light gauge shape sheet steel for the floor portion can be set based on the setting by the setting screen 501 and the setting screen 502.

9. Screen 509 Showing the State in which Each Floor Panel Member is Automatically Arranged (FIG. 12)

Figure 11:
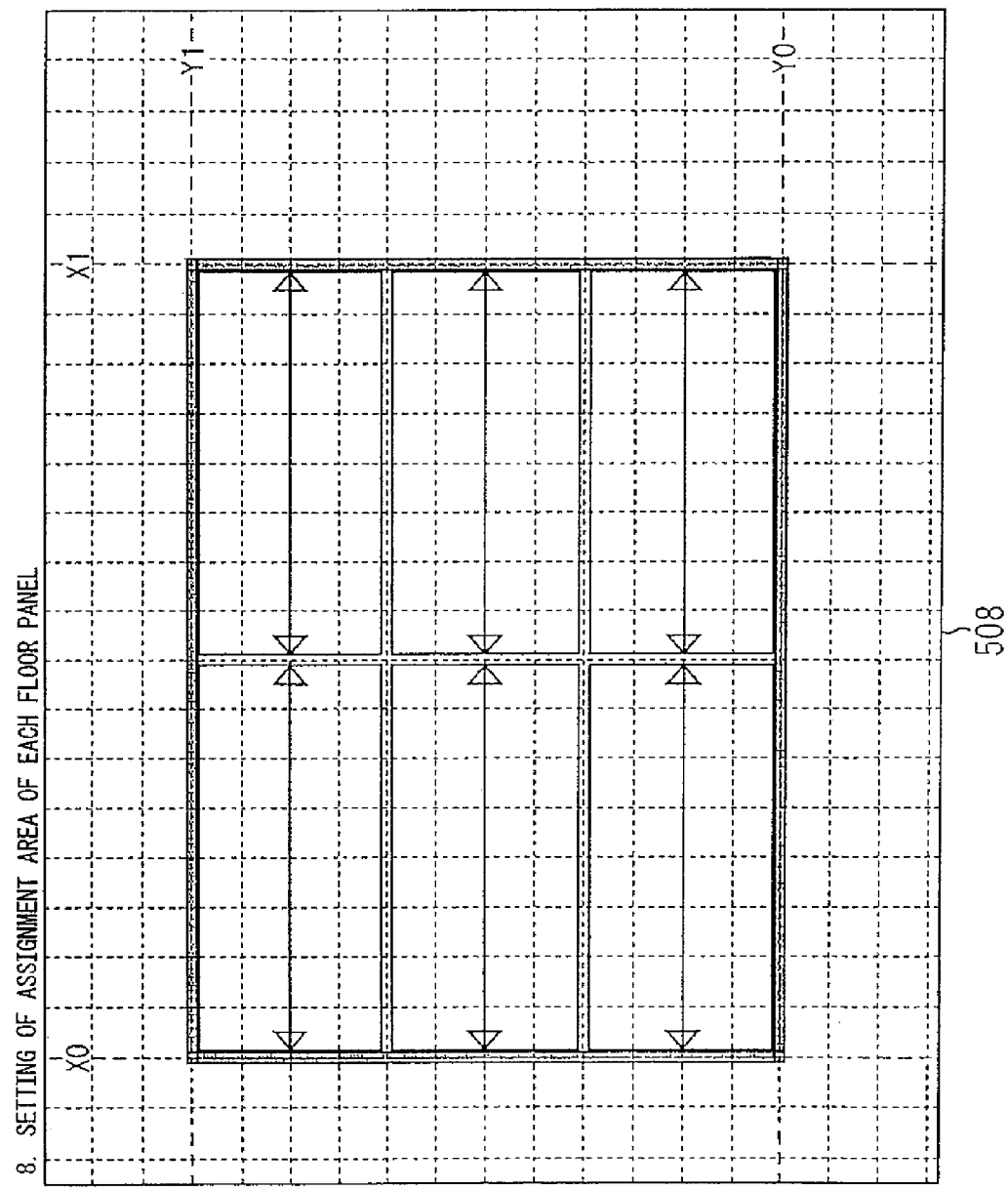
FIG. 11 is a diagram for explaining a screen (a screen for setting the assignment area of each floor panel) of the display unit of the information processing system shown in FIG. 1.

On the screen 509, the state of the light gauge shape sheet steel (floor panel members) automatically arranged based on the setting on the screen 508 of FIG. 11 is displayed.

Figure 13:
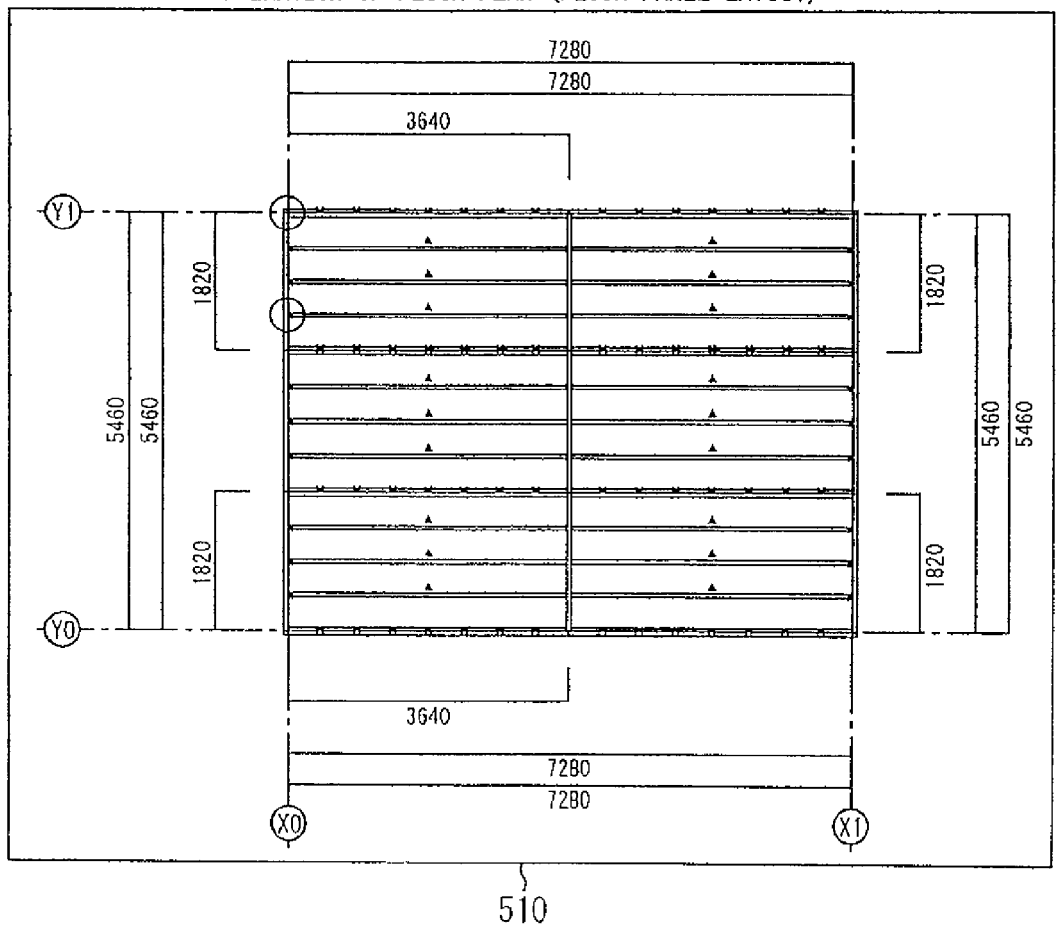
FIG. 13 is a diagram for explaining a screen (a screen showing the state in which a floor plan is automatically prepared) of the display unit of the information processing system shown in FIG. 1.

10. Screen 510 Showing the State in which the Floor Plan is Automatically Generated (FIG. 13)

Figure 12:
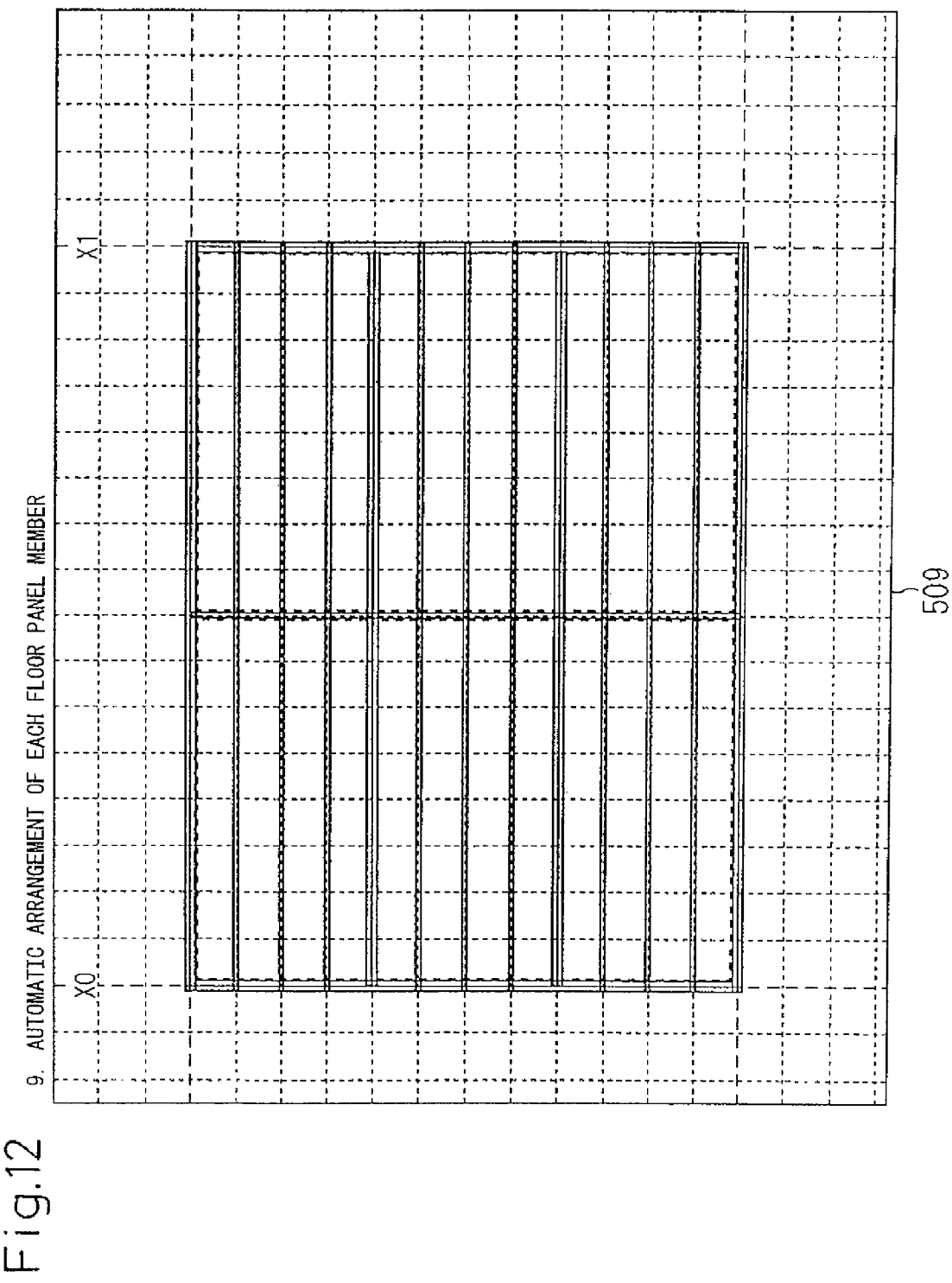
FIG. 12 is a diagram for explaining a screen (a screen showing the state in which each floor panel member is automatically arranged) of the display unit of the information processing system shown in FIG. 1.

On the screen 510, the light gauge shape sheet steel automatically arranged suitably with respect to positions of the light gauge shape sheet steel shown on the screen 509 of FIG. 12 are displayed.

11. Screen 511 for Determining Roof Area (FIG. 14)

The screen 511 is configured so that the shape, etc. of the roof portion can be determined based on the setting on the setting screen 501 and the setting on the setting screen 502.

12. Screen 512 Showing the State in which the Roof Truss Members are Automatically Arranged (FIG. 15)

Figure 14:
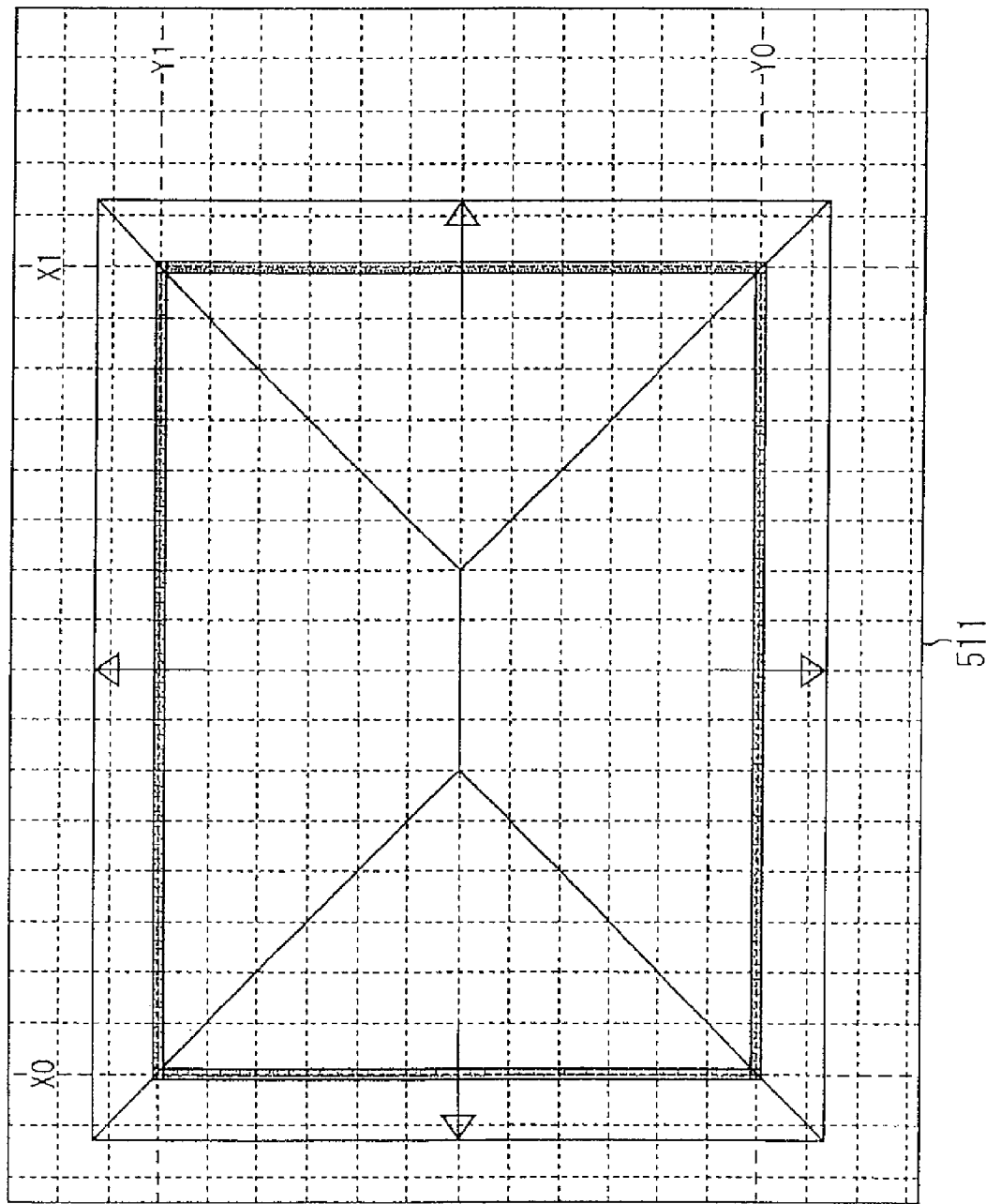
FIG. 14 is a diagram for explaining a screen (a screen for determining the roof area) of the display unit of the information processing system shown in FIG. 1.

On the screen 512, the state of the light gauge shape sheet steel (roof truss members) automatically arranged based on the determination on the screen 511 of FIG. 14 is displayed.

13. Screen 513 Showing the State with the Truss Drawing Automatically Generated (FIG. 16)

On the screen 513, the truss drawing automatically generated based on the arrangement of the light gauge shape sheet steel (roof truss members) shown on the screen 512 of FIG. 15 is displayed.

Figure 17:
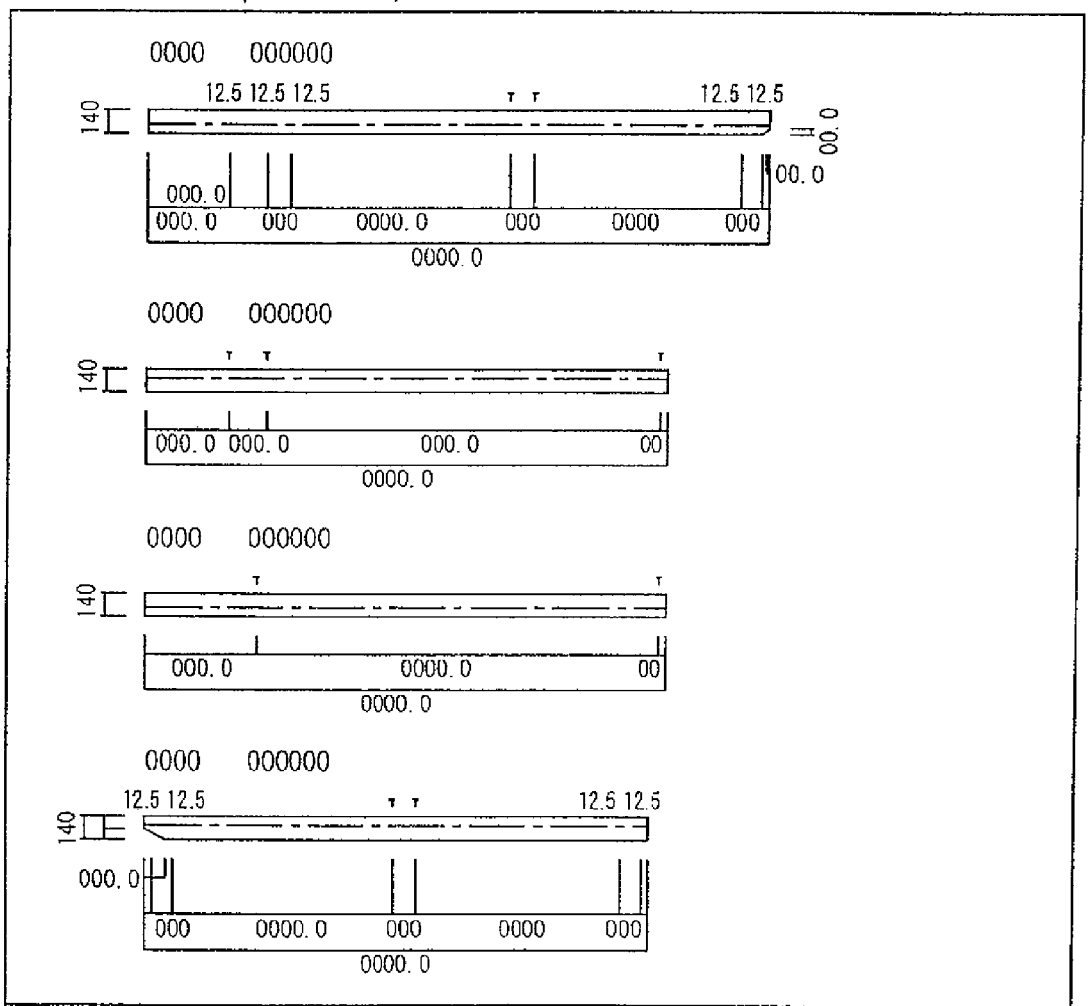
FIG. 17 is a diagram for explaining a screen (a screen showing the state developed (shape steel) into the truss members) of the display unit of the information processing system shown in FIG. 1.

14. Screen 514 Showing the State Developed (Shape Steel) into Truss Members (FIG. 17)

On the screen 514, the size, etc. of light gauge shape sheet steel (roof truss members) making up the roof portion are displayed.

Figure 18:
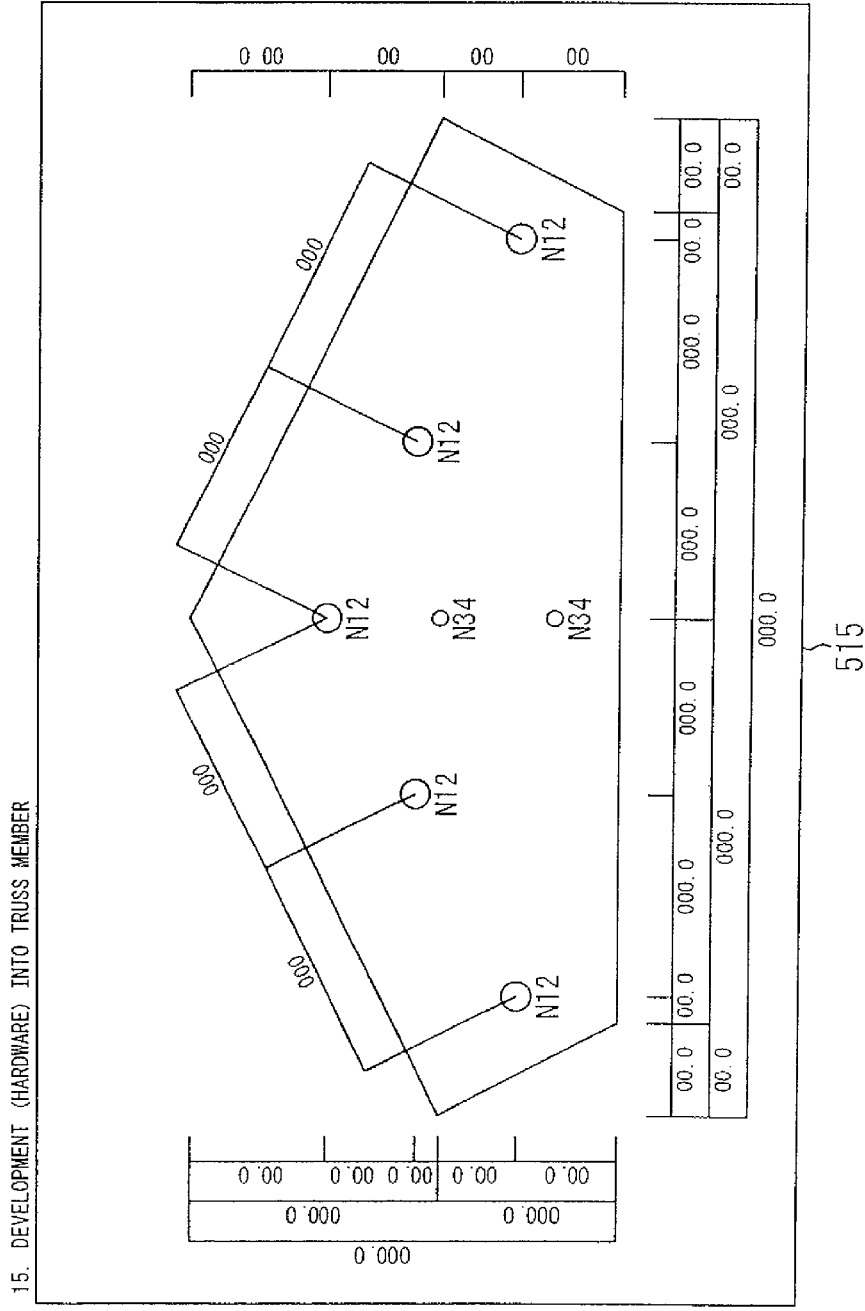
FIG. 18 is a diagram for explaining a screen (a screen showing the state developed (hardware) into the truss members) of the display unit of the information processing system shown in FIG. 1.

15. Screen 515 Showing the State Developed (Hardware) into the Truss Member (FIG. 18)

On the screen 515, the joints (hardware positions) of individual light gauge shape sheet steel (roof truss members) making up the roof portion are displayed.

The setting of various information and the automatic arrangement of the light gauge shape sheet steel in 1 to 15 above are implemented by the design drawing generating unit 101.

16. Screen 516 Showing the State in which the Shape Steel Production Data are Automatically Totaled (FIG. 19)

On the screen 516, the order list (steel member order list) information obtained by automatically totaling the information (design drawing generating unit 101) obtained from screens 501 to 515 of FIGS. 4 to 18 is displayed. This automatic totaling operation is carried out by the order list generating unit 102. Also, on the screen 516, the steel member order list information can be transmitted. The transmission in this case includes the transmission to the member production control unit 103, and the transmission to the external devices through a communication network described herein below. Thus, the member production control unit 103, based on the steel member order list information transmitted from the screen 516 of FIG. 19, produces the light gauge shape sheet steel under the control of the computer.

Incidentally, according to this exemplary embodiment of the present invention, the objective building is assumed to be a steel house, as an example, and the building material is assumed to be the light gauge shape sheet steel. It should be understood that the present invention is not limited to such materials. In addition, this exemplary embodiment is applicable to the design and the member production for the entire building or part thereof.

Also, according to this exemplary embodiment, the light gauge shape sheet steel are produced based on the design drawing information acquired by the single information processing system 100. This invention, however, is not limited to this case, but applicable to a case in which the order list information obtained based on the design drawing information is obtained from an external source through communication means, and based on this information, the light gauge shape sheet steel may be produced. In particular, in the information processing system 100, the order list information obtained by an external device having the function of the design drawing generating unit 101 and the order list generating unit 102 are received through a communication network (the network 300, etc. shown in FIG. 2).

The member production control unit 103, based on the received information (order list information), machines the sheet steel under the control of computer and produces the light gauge shape sheet steel. As a result, the building designer and the light gauge shape sheet steel maker can automate the processing steps from the design to the production of the light gauge shape sheet steel in its entirety through a communication network.

Also, in the information processing system 100, for example, the order list information obtained by the external device having the function of the design drawing generating unit 101 and the order list generating unit 102 or especially, the panel working drawing (panel working drawing) and the specification information obtained by assembling the light gauge shape sheet steel are received through a communication network. The member production control unit 103, based on the received information (the panel working drawing and the specification information) and the information on the light gauge shape sheet steel required for panel production stored beforehand in the storage unit 104, assembles the light gauge shape sheet steel and produces panels under the control of computer. In this way, not only the production of the light gauge shape sheet steel from the design stage but the whole process up to the panel assembly step can be automated in its entirety.

One of the objects of the present invention can of course be achieved also in such a manner that a storage medium storing the program code of the software for implementing the functions of the host and the terminals according to the embodiment is supplied to a system or a device, and the computer (CPU or MPU) of the particular system or the device reads and executes the program code stored in the storage medium. In this case, the program code read from the storage medium implements the functions of this embodiment and the storage medium for storing the particular program is included in this invention.

The storage media that can be used for providing the program code include a ROM, a flexible disk, a hard disk, an optical disk, a magneto-optic disk, a CD-ROM, a CD-R, a magnetic tape or a non-volatile memory card.

Also, an exemplary embodiment of the present invention can be applied for a case in which by executing the program code read by the computer, not only the functions of this embodiment are implemented, but also based on the instruction of this program code, the OS (operating system), etc. operating on the computer executes a part or the whole of actual processing, whereby the functions of this embodiment are implemented.

Further, an exemplary embodiment of the present invention can be applied for a case in which the program code read from the storage medium is written into a memory associated with the function extension board inserted in the computer or the function extension unit connected to the computer, after which based on the instruction of the particular program code, the CPU of the function extension board or the function extension unit, as the case may be, executes a part or all of the actual processing, whereby the functions of this embodiment are implemented.

As described above, according to the present invention, the production of the building members can be realized by the CAD/CAM systems. Therefore, the building materials can be efficiently produced. In particulate, the following effects can be exhibited:

(1) By inputting the design conditions of an objective building, the wall panel drawing, the floor panel drawing and the roof truss drawing can be automatically generated.

(2) From the design drawing information such as the wall panel drawing, the floor panel drawing and the roof truss drawing, the members used for the objective building are directly totaled and a list of the members (steel member order list) can be prepared.

(3) Using the member list information (CAD data), the CAM system for producing the building materials can be connected.

Another embodiment of the present invention is explained below with reference to FIGS. 20 to 26.

Figure 20:
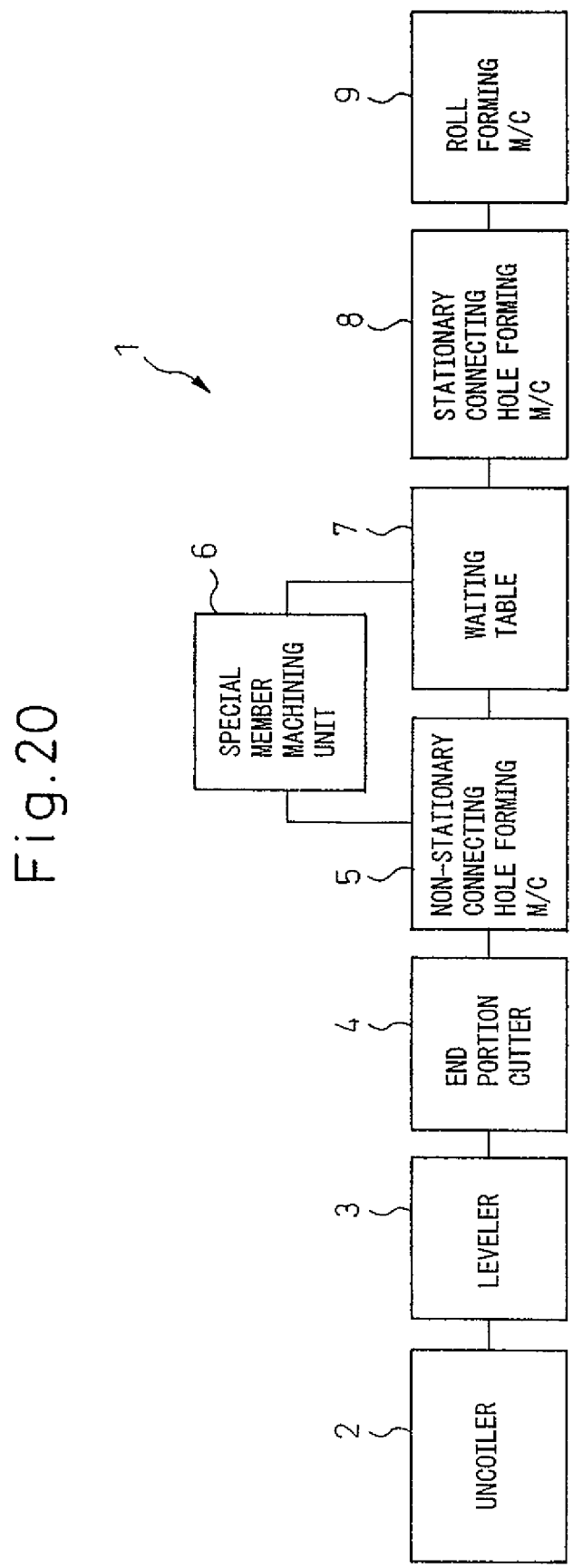
FIG. 20 is a schematic diagram showing a general configuration of the production equipment of the light gauge shape sheet steel for a steel house according to an exemplary embodiment of the present invention.
Figure 21:
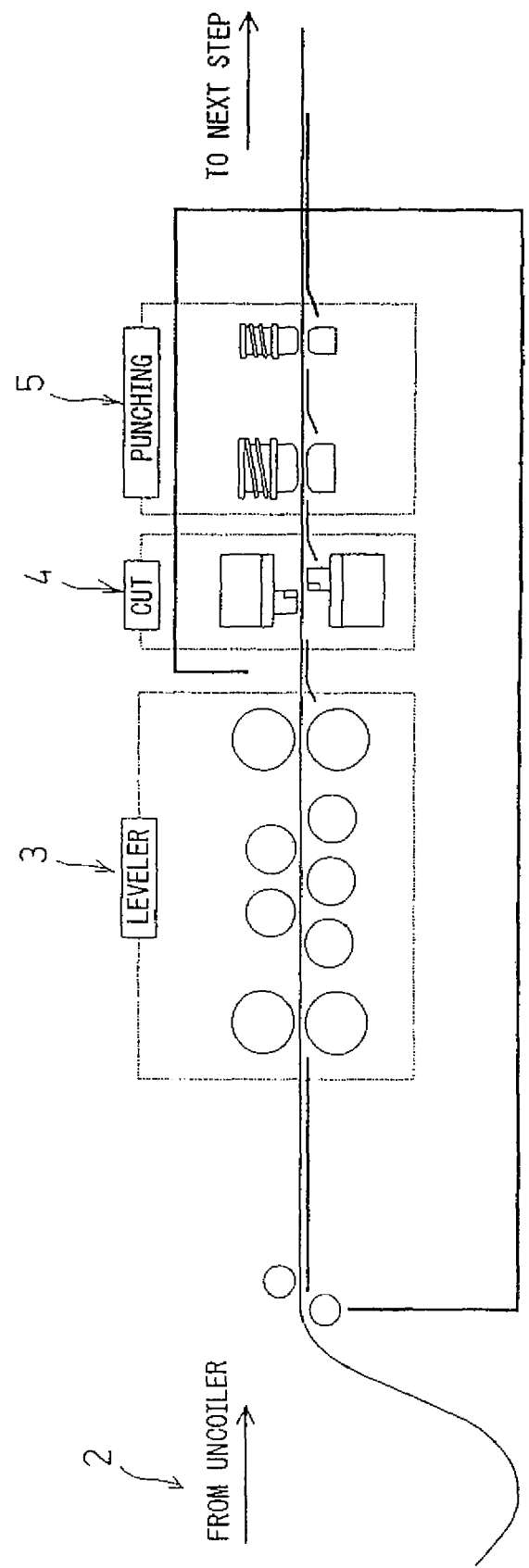
FIG. 21 is a schematic diagram showing the step of the leveler of the production equipment of the light gauge shape sheet steel for a steel house according to an exemplary embodiment of the present invention.

Referring to FIGS. 20 and 21, an equipment 1 for producing the light gauge shape sheet steel for a steel house according to this invention comprises an uncoiler 2 for rewinding the sheet steel curled in a coil, a leveler 3 for straightening the sheet steel, an end portion cutter 4 for cutting the front end portion to a predetermined shape after straightening, a non-stationary fastening hole forming machine 5 for forming the fastening holes not requiring a high machining accuracy in the sheet steel in motion, a waiting table 7 for keeping in a standby state the sheet steel formed with the fastening holes, a stationary fastening hole forming machine 8 for forming the fastening holes requiring a high machining accuracy, and a roll forming machine 9 for forming the sheet steel formed with the fastening holes into the light gauge shape sheet steel for a steel house having a predetermined cross section by the roll forming method. The uncoiler 2, the leveler 3, the end portion cutter 4, the non-stationary fastening hole forming machine 5, the waiting table 7, the stationary fastening hole forming machine 8 and the roll forming machine 9 make up a main production line.

Further, the equipment 1 for producing the light gauge shape sheet steel for a steel house comprises a special member machining unit 6. This special member machining unit 6, after the fastening holes are formed by the non-stationary fastening hole forming machine 5 and the rear end of the sheet steel is cut to a predetermined size and shape by the end portion cutter 4, machines the sheet steel to a special shape without stopping the flow of the main production line 2 to 9. The sheet steel machined by the special member machining unit 6 are returned again to the waiting table 7 of the main production line.

The fastening holes not requiring very high machining accuracy formed by the non-stationary fastening hole forming machine 5 include the fastening holes for connecting the light gauge shape sheet steel of the steel house to the structural face plates and the fastening holes for passing the electrical wiring. These fastening holes do not require high machining accuracy due to their intended applications. The fastening holes requiring high machining accuracy formed by the stationary fastening hole forming machine 8, on the other hand, include the fastening holes for connecting the light gauge shape sheet steel for the steel house. These fastening holes require high accuracy due to their positioning function in connecting the panels to each other.

Figure 22:
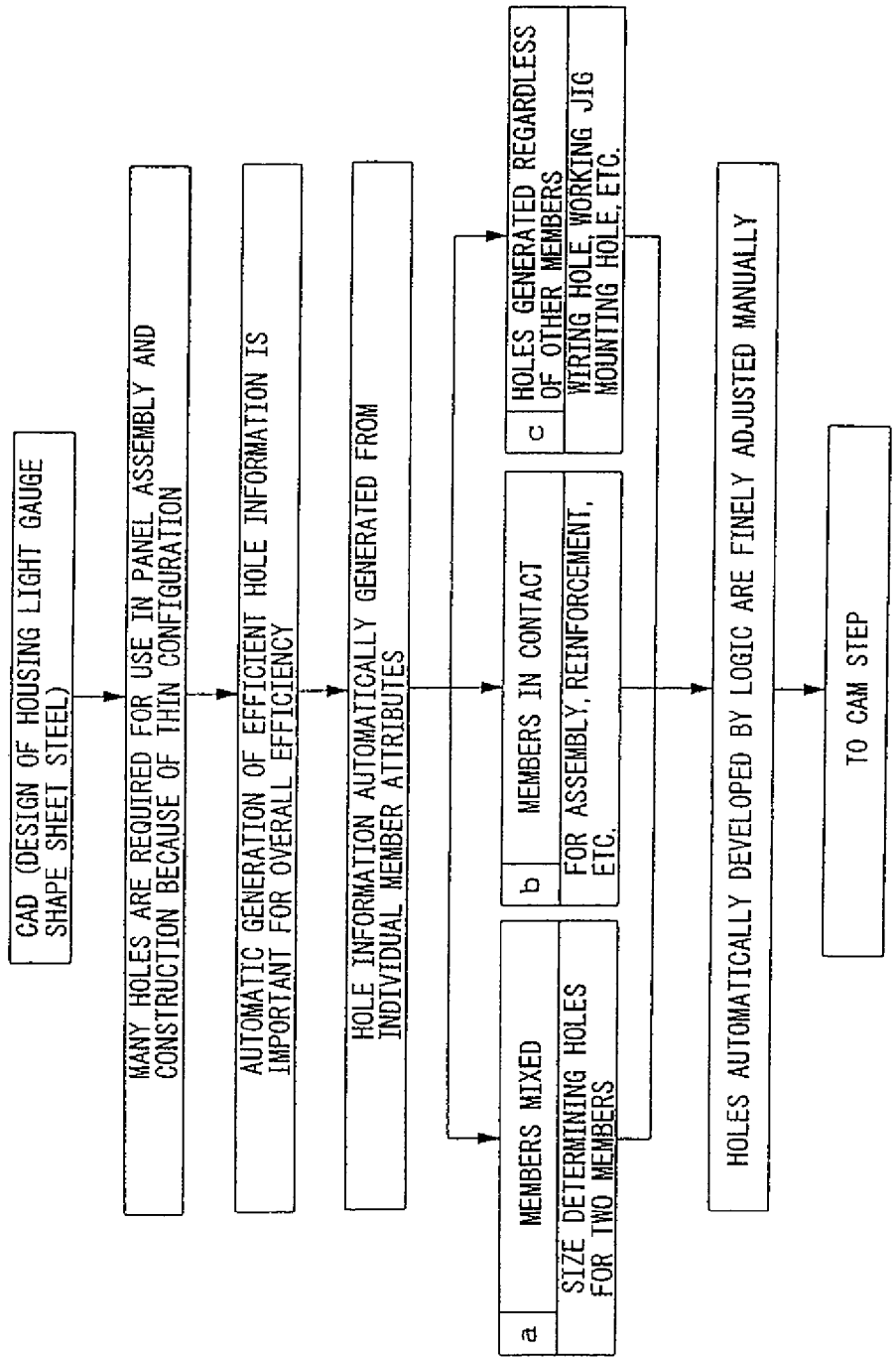
FIG. 22 is a schematic diagram showing a system to generate the fastening hole information from the attributes of individual members in designing a building by the CAD system according to an exemplary embodiment of the present invention.

Then, the CAD system for automatically generating the fastening hole information is explained with reference to FIGS. 22 and 23.

Figure 23:
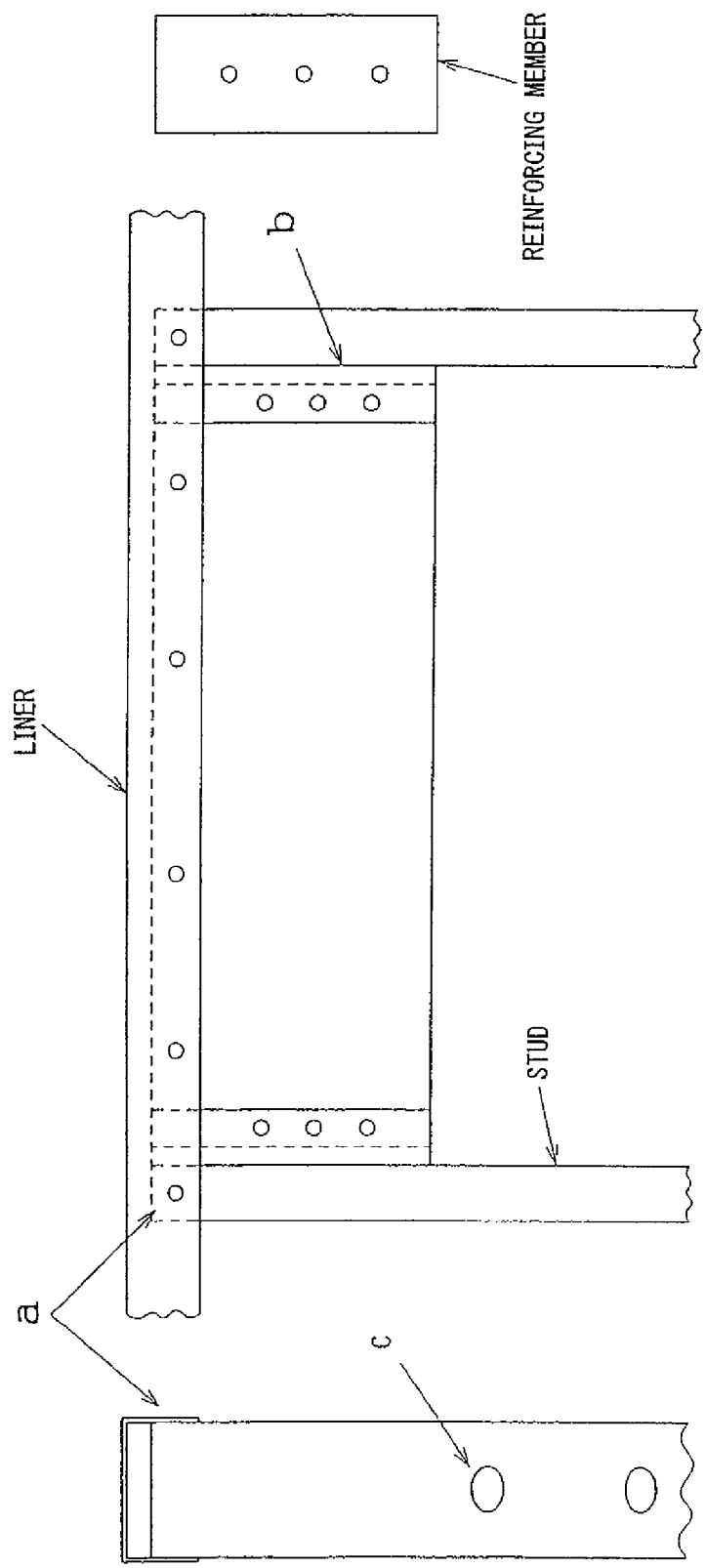
FIG. 23 is a diagram showing a system to generate the fastening hole information from the attributes of individual members in designing a building by the CAD system.
Figure 27:
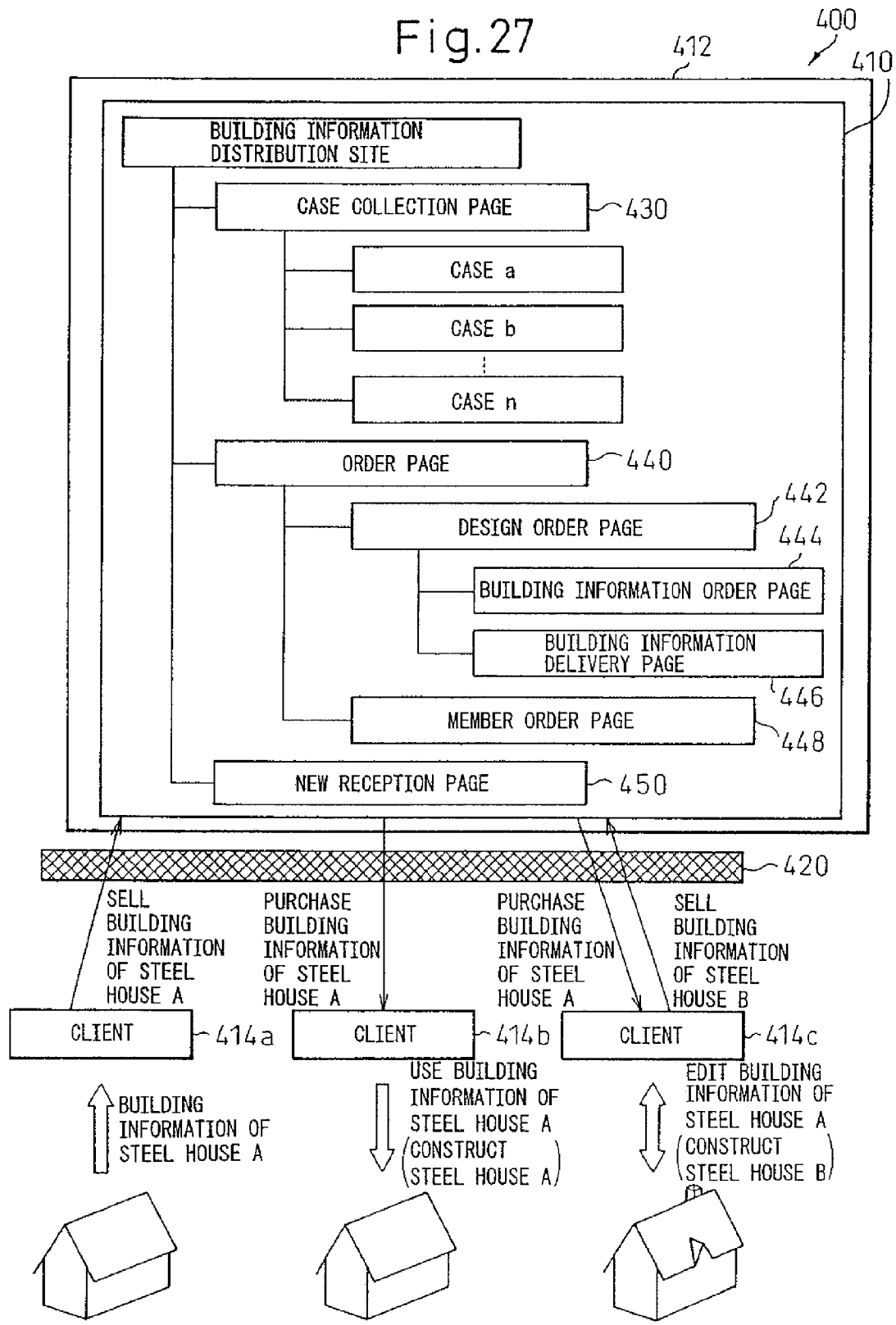
FIG. 27 is a schematic diagram showing a building information distribution aiding system according to the invention, which is a diagram showing the page in the building information distribution site as a directory structure.
Figure 28:
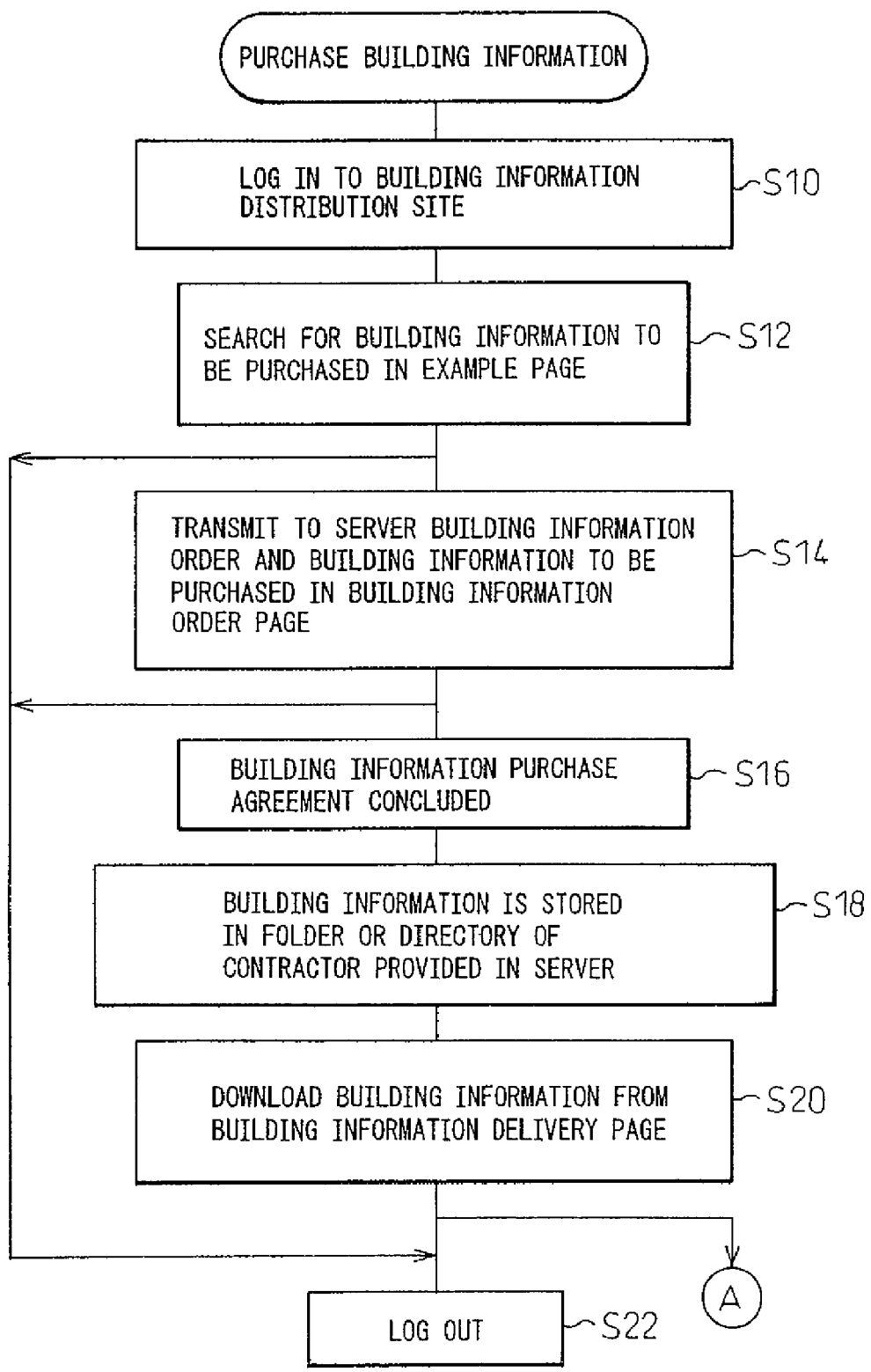
FIG. 28 is a flowchart showing the process executed by the server and the client in purchasing the building information.
Figure 29:
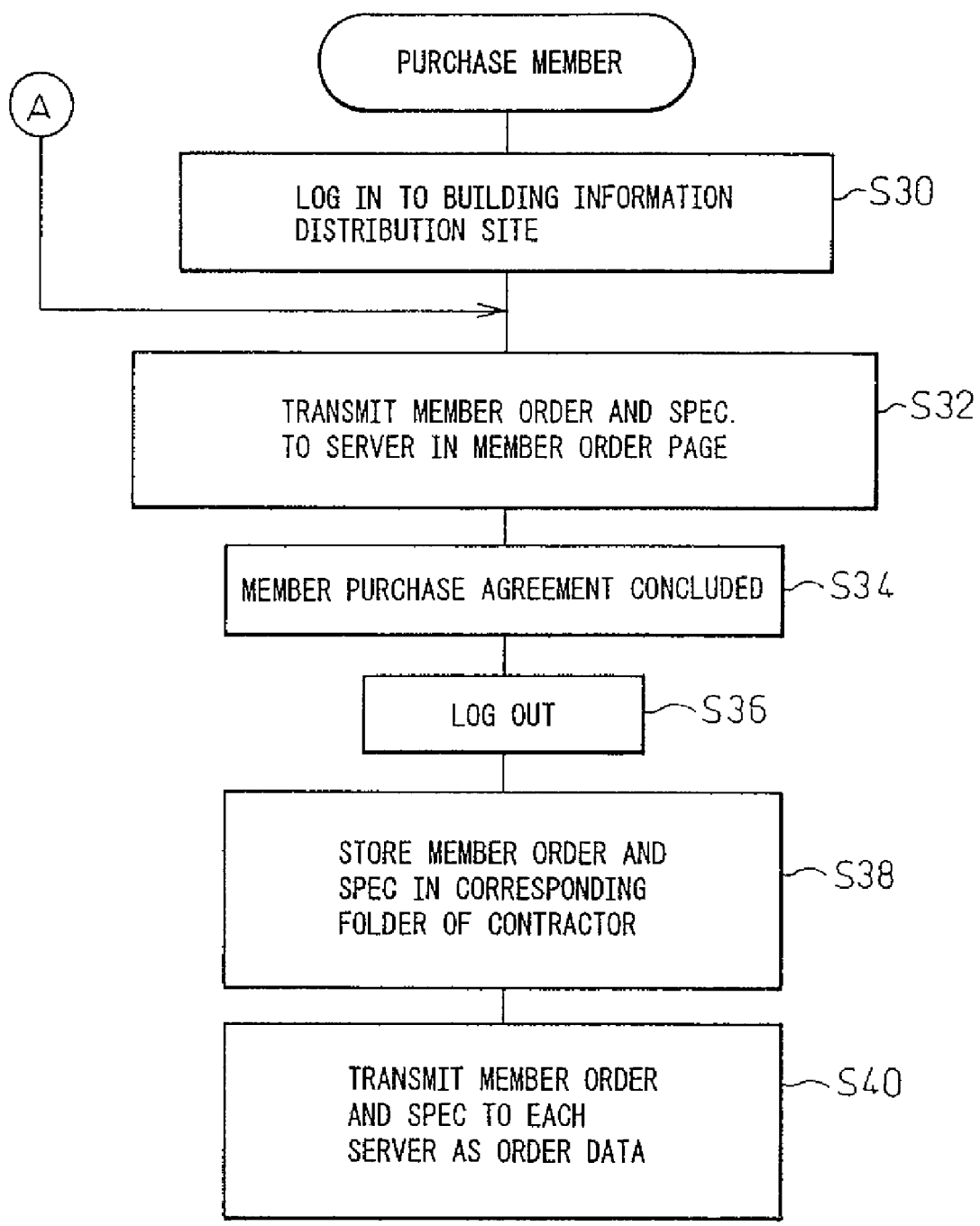
FIG. 29 is a flowchart showing the process executed by the sever and the client in purchasing the members.

In the CAD system, members including a runner, a stud and a reinforcing member are arranged as shown in FIG. 23, and connected to each other to design a building. In the process, the fastening hole information including the joint between the runner and the stud, the joint between the reinforcing member and the stud, the joint between the stud and the structural face plate and the wiring holes formed in the stud are automatically generated from the attributes of the individual members. The fastening hole information automatically generated at the time of designing a building by the CAD system are fetched as member control information for the production control system.

In FIG. 23, character a designates the joint between the stud and the runner, and the fastening holes of each member has a high machining accuracy due to the positioning function between them. Character b designates a joint for mounting the reinforcing member on the stud, and requires not so high machining accuracy as the joint a. Character c designates a hole for electrical wiring or a fastening hole for mounting the stud on the structural face plate, and does not require a high machining accuracy.

In the computer-controlled production control system for the production line of the light gauge shape sheet steel of a steel house, the shape steel has a two-dimensional cross section after being roll formed. In order to form the fastening holes by the non-stationary fastening hole forming machine and the stationary fastening hole forming machine, therefore, the positions of the fastening holes are required to be two-dimensionally controlled. According to this invention, the shape steel having a two-dimensional cross section is developed into a flat surface and the positions of the fastening holes are controlled as one-dimensional information with a reference axis along the length of the members for each surface.

Referring to FIG. 24A, the sheet steel is formed by the roll forming equipment into a C-frame shape steel 20 having a two-dimensional cross section. As an example, the C-frame shape steel 20 shown in FIG. 24A has five faces 21, 22, 23, 24 and 25. According to this exemplary embodiment of the present invention, such C-frame shape steel 20 is developed into a flat surface as shown in FIG. 24B, and the positions of the fastening holes to be formed in the five faces 21 to 25 are controlled as one-dimensional information along the longitudinal reference axis. As a result, the data management of the positions of the fastening holes is facilitated, thereby making it possible to easily control the non-stationary fastening hole forming machine 5 and the stationary fastening hole forming machine 8.

According to the present invention, the shape steel is classified into a general member, an application member and a special member. Referring to FIG. 25, the general member 30 has a shape with the two ends of sheet steel cut at right angles. The application member 31, with the end portions thereof cut not at right angles, is cut only at the end portions of sheet steel. The special member 32 should not only to be cut at the end portions thereof, but also to be machined.

The application member 31, whose shape of the cut end portions may be standardized in the future, can be machined on the main production line like the general member 30 when being cut by the end portion cutter 4 following the straightening step by the leveler 3. The special member 32, due to its unique machining position, would require an exclusive machining unit and the machining operation would affect the productivity of the whole production line, if produced on the main production line. In the production equipment 1 of the light gauge shape sheet steel of a steel house according to the invention, therefore, the special member 32 is returned to the main production line after completion of the common machining operation on the main production line and the machining operation off line by the special member machining unit 6.

Next, referring to FIG. 26, the production control system according to the present invention is explained herein below.

The production control system 40 can be implemented with a computer and has a machining control unit 41. The machining control unit 41 has stored therein the member machining information including the member numbers, the steel material standard (plating type), the shape information, length, width and the shape and type of the fastening holes, the requirement or no requirement of high machining accuracy, and the positions and number of the fastening holes, for the light gauge shape sheet steel of each of a plurality of types of steel house to be produced, so that the production process is controlled based on these member machining information. The machining control unit 41 includes the leveler 3 of the production equipment 1 for the light gauge shape sheet steel of the steel house, the end portion cutter 4, a control unit 42 for the non-stationary fastening hole forming machine 5, a control unit 43 for the waiting table 7, the control unit 44 for the stationary fastening hole forming machine 8, a control unit 45 for the roll forming machine 9 and a control unit 46 for controlling the operation of printing the serial numbers or the like on an ink jet printer 10. Also, in the machining control unit 41, the shape steel actually produced is recorded as a machining achievement record 47.

The machining control unit 41 has determining means (not shown) for discriminating, based on the member machining information, the member used for production into one of the general member 30, the application member 31 and the special member 32 during the process preceding to the leveler 3. The machining control unit 41 determines, based on the result of determination in the determining means, whether the member to be machined is to be produced on the main production line 3 to 9 or to be machined off line by the special member machining unit 6.

The main production line executes (1) the step of straightening by the leveler 3, (2) the step of forming the fastening holes not requiring high machining accuracy by the non-stationary fastening hole forming machine 5, (3) the step of cutting the end portions of the sheet steel by the end portion cutter 4, (4) the step of waiting on the waiting table 7, (5) the step of forming the fastening holes requiring high machining accuracy by the stationary fastening hole forming machine 8, (6) the step of forming into shape steel by the roll forming machine 9, and (7) the step of printing the serial number, etc. on the formed shape steel by the ink jet printer 10, in that order.

The off-line production process by the special member machining unit 6 includes (8) the step of machining to a special shape the special member 32 passed through the steps (1) to (3) on the main production line, and (9) the step of returning the special member thus machined to the special shape back to the waiting table 7 on the main production line, in that order. When moving the special member 32 from the main production line to the special member machining unit 6, a control signal is transmitted to the computer and the data thereof is stored in the machining control unit 41. When the special member 32 that has been machined to the special shape in the off-line production process is returned to the waiting table 7 of the main production line, a control signal to that effect is transmitted to the computer and the data is stored in the machining control unit 41. The subsequent steps of production of the special member 32 are incorporated into the production control system of the main production line.

In the case where a member to be machined is determined to be a general member 30 or an application member 31, the machining control unit 41 transmits the control information to the control units 42 to 47 based on the member machining control information, and thereby controls the steps (1) to (7) of the main production line.

In the case where a member to be machined is determined to be a special member by the determining means, at the end of steps (1) to (3), the machining control unit 41, based on the member machining information, sends a control signal to the transfer means for transferring the special member 32 from the main production line to the special member machining unit 6, and thereby transfers the special member 32 to the special member machining unit 6. The control signal indicating that the special member 32 has been transferred to the special member machining unit 6 is transmitted to the machining control unit 41 from the transfer means and stored as data. The special member 32 is machined to special shape off line by the special member machining unit 6, and then returned to the waiting table on the main production line. In the process, the control signal is transmitted to the machining control unit 41 and stored as data.

As described above, the special member 32 which is difficult to machine on the main production line is machined on the main production line for the common machining operation and machined off line to a special shape by the special member machining unit 6. After this machining operation, the special member 32 is returned to the main production line. In this way, the production control system for the light gauge shape sheet steel of a steel house including the general member 30, the application member 31 and the special member 32 is implemented.

According to an exemplary embodiment of the present invention, in addition to the fastening hole forming step with the conventional stationary fastening hole forming machine, the fastening holes are formed by the non-stationary fastening hole forming machine without stopping the work flow in the leveler stage, thereby improving the productivity of the whole production line of the light gauge shape sheet steel of the steel house. Further, the fastening holes are divided into those not requiring high machining accuracy and those requiring high machining accuracy, and the fastening holes not requiring high machining accuracy are formed by the non-stationary fastening hole machine without stopping the work flow, while the fastening holes requiring high machining accuracy are formed by the stationary fastening hole forming machine by stopping the movement of the work. Thus, the assembly work for constructing a steel house of the prefabricated building materials is facilitated.

Also, in the computer-controlled production control system for producing the light gauge shape sheet steel of a steel house according to the present invention, the general member, the application member and the special member are discriminated in the leveler step based on the member control information of the production control system, so that the general member and the application member are machined on the main production line, while the special member, after being machined on the main production line for the common machining process, is machined off line to a special shape and then returned to the main production line. In this manner, the production of even the special member which is difficult to machine on the main production line can be controlled by the production line production control system, thereby improving the flexibility of the production process.

Further, in the computer-controlled production control system for producing the light gauge shape sheet steel for a steel house according to the present invention, a steel house is designed by the CAD system in such a manner that the information including the positions, size and the machining accuracy of the fastening holes are generated automatically in accordance with the attribute of each member, and by fetching the particular fastening hole information into the member control information, a multiplicity of the fastening hole information can be efficiently controlled.

In view of the fact that the shape steel has a two-dimensional shape of the cross section after roll forming, the position information of the fastening holes formed in the shape steel are required to be controlled two-dimensionally. According to an exemplary embodiment of the present invention, in contrast, the shape steel is developed into a flat surface, and the position information of the fastening holes is controlled one-dimensionally along the length of each member for each portion of the developed shape steel, thereby making it possible to easily control the process of forming the fastening holes.

A building information distribution aiding system according to an exemplary embodiment of the present invention is explained below with reference to FIGS. 27 to 30.

A building information distribution aiding system 400 according to this exemplary embodiment comprises a server 412 for providing a building information distribution site 410, and clients 414a, 414b, 414c and so on used by the party (hereinafter referred to as a contractor) designing and/or constructing a building according to the steel house construction method. The server 412 and the clients 414a, 414b, 414c and so on are connected by a communication line thereby making up a network (WAN) 420. The communication line may include a known wire or wireless communication system such as a dedicated line, a general telephone line, ISDN, DSL, a portable telephone line, a subscription radio access system, a radio LAN system or a CATV network.

The server 412, in order to provide a building information distribution site 400 accessible through the network 20 from the clients 414a, 414b, 414c and so on, includes a CPU, a RAM (random access memory), a disk drive unit for storing the internal information of the building information distribution site 400, and an interface unit such as an Ethernet card or a modem for transmitting and receiving data to and from the clients 414a, 414b, 414c and so on. The server 412 is preferably an ASP (application service provider) for controlling the applications. This is to specify the participants accessible to the building information distribution site 400 by password authentication while at the same time securing the quality of the steel house by limiting the contractors satisfying predetermined standards according to the invention. Also, by employing ASP, the burden on the clients 414a, 414b, 414c and so on and the system administration cost can be reduced.

According to this exemplary embodiment, objects to be distributed include the building information such as the structural design, the framework panel working drawing, the framework panel layout and the production data of the steel house. The building information to be distributed is not limited to those prepared by contractors but may be that prepared by the manager. Also, the building information to be distributed has attached thereto a reference number for management, and a uniform file is used by the type of data included in the building information to facilitate distribution of the building information among the contractors and to permit the design change by the contractors. The file of each building information may be that of widely used applications. For example, the building design, the shape steel order and the production data may be the spreadsheet software in the form such as Excel (trade mark) (xls file) of Microsoft, while the framework panel working drawing and the framework panel layout drawing may be CAD software in the form (dwg file) such as for AutoCAD (trade mark) of Autodesk.

The building information distribution site 400, as shown in FIG. 1, includes at least a case collection page 430, an order page 440 and a new reception page 450.

The case collection page 430 exhibits actual cases of the steel house constructed based on the building information. As case a, case b, . . . , case n, for example, the photos, layout, area, number of steps and the like information of buildings completed are illustrated for each case, and can be retrieved by the construction period, building area, reference number, etc. of each building.

The order page 440 is configured of a design order page 442 used by the contractors to purchase the building information, and a design order page 448 used for purchasing the members required for construction. The design order page 442 is configured of a building information order page 444 for the contractor to transmit the building information order to the manager and a building information delivery page 446 for the manager to supply the building information to the contractors. The design order page 442 and the member order page 448 are prepared in a folder or a directory unique to each contractor, each of which is accessible only by the manager and the corresponding contractor.

The new reception page 450 can be used by the contractor to sell the building information to the manager, and the building information of the steel house is delivered to the manager from the contractor through the new reception page 450.

The clients 414a, 414b, 414c and so forth on the part of the contractor can be formed of ordinary personal computers, and include a CPU, a RAM, a disk drive for storing the building information, and an interface unit such as an Ethernet card or a modem for transmitting and receiving the data to and from a server 412. Also, the clients 414a, 414b, 414c and so forth are installed with means of editing the building information such as the application software (Excel (trade mark) of Microsoft or AutoCAD (trade mark) of Autodesk) that can edit the format of the xls file and dwg file of the building information.

The operation of the building information distribution aiding system according to the invention is explained below with reference to FIGS. 2 to 4.

First, the contractor studying the distribution of the building information in the building information distribution site 400 accesses the server 412 through the network 20 by the clients 414a, 414b, 414c and so on, and after being authenticated by the account and the password, logs in to the building information distribution site 400 (step S10). Next, in the case collection page 430 carrying a plurality of actual cases a, b, . . . , n, an actual case having the desired plan is selected (step S12). In the process, the contractor can efficiently find an actual case to be purchased, by use of the search system described above.

The contractor can log out as soon as no actual case having the desired plan cannot be found as the result of search (step S22). Assume that the contractor has found the desired plan in the case collection page 430, on the other hand, or in the case where the contractor has decided to use the case a of a steel house A. The contractor goes through the procedure for acquiring the building information of the steel house A in the design order page 442 in the order page 440 (step S14). Specifically, the contractor transmits to the server 412 through the building information order page 444 a building information order including the items for specifying the contractor, the reference number of the building information to be purchased and an expression of the will to purchase the particular building information. By transmitting the building information order to the server 412, a building information purchase agreement for the steel house A is concluded (step S16). In order to authenticate the validity of the procedure, it is desirable to employ an electronic signature system in which the contractor encrypts the building information order with a secret key, and the manager decrypts the order with a public key or an authentication system using a digital certificate issued from the manager or the company providing the authentication service.

The contractor, upon transmission of the building information order to the server 412, logs out from the building information distribution site 400 (step S22) or standing by as it is, downloads the building information purchased, as described later.

The server 412, upon receipt of the building information order through the building information order page 444, specifies the contractor from the items described in the building information order, and stores the building information order in a predetermined file by relating it to the contractor, while at the same time storing the building information of the steel house A in the download folder of the contractor (step S18). From this time point, the contractor that has purchased the building information of the steel house A can download the building information from the building information delivery page 446 (step S20). The contractor that has logged out from the building information distribution site 400 before downloading the building information purchased is of course required to log in to the building information distribution site 400 again to download the particular building information.

The contractor that has downloaded the building information of the steel house A uses the building information of the steel house A as it is, or edits the building information of the steel house A as required using the application software installed in the clients 414a, 414b, 414c, and so on. In this way, the contractor can design a building B as a steel house as corrected from the steel house A. According to this invention, the building information is unified in file format, and therefore the edit work can be carried out very easily.

The shape steel, etc. of the steel house can be ordered (FIG. 3) through the member order page 448 of the order page 440 in the building information distribution site 400. Specifically, the contractor that purchases for a member logs in to the building information distribution site 400 (step S30), and places an order for the member by transmitting from the member order page 448 to the server 412 a member order including the items for specifying the contractor and the expression of the will to purchase the member described in the specification, and a specification of the member to be purchased (step S32). At this time point, the purchase agreement for the particular member is concluded (step S34). After placing the order for the member, the contractor can log out from the server 412 (step S36). To meet the requirement for authentication of the validity of the procedure, preferably, an electronic signature system is employed in which the contractor encrypts the member order and the specification with a secret key and the manager decrypts them with a public key, or an authentication system using a digital certificate issued from the manager or the company providing the authentication service.

The server 412 stores the member order and the specification received through the member order page 448 in the corresponding folder of the contractor (step S38), while at the same time transmitting them as an order data to the server (not shown) of each department of production, distribution and accounting of the corresponding member (step S40).

The contractor can prepare in a predetermined format and sell the building information of the steel house that has been constructed in the past, through the new reception page 450 in the building information distribution site 400 (FIG. 4). In this case, the contractor logs in to the building information distribution site 400 (step S50), and transmits to the server 412, through the new reception page 450, an offer to sell the building information including the items to specify the contractor, the expression of the desire to sell the building information through the building information distribution site 400, etc. and the building information to be sold (step S52). At this time point, the contractor can log out from the building information distribution site 400 (step S54). To meet the requirement for authentication of the validity of the procedure, it is desirable to employ an electronic signature system in which the contractor encrypts the offer to sell the building information and the building information to be sold with a secret key and the manager decrypts them with a public key, or an authentication system using a digital certificate issued from the manager or the company providing the authentication service.

The server 412 stores the offer to sell the building information and the building information transmitted, in a predetermined folder such as a folder on the hard drive of the personal computer of the person in charge, by studying the purchase of the new building information (step S56). In step S58, the purchase of the new building information is studied, and in the case where the new building information is purchased, the will to purchase the new building information is sent to the contractor using the communication means such as E-mail (step S60), and the new building information is carried in the case collection page (step S64). In the case where it is determined in step S58 that the new building information is not purchased, the wish not to purchase the new building information is transmitted to the contractor using the communication means such as E-mail (step S62).

According to an exemplary embodiment of the present invention, the contractor on one party that provides (sells) the building information can gain a profit from the building information which otherwise might not have been reused in the future on the one hand, and the contractor on the other party who uses (purchases) the building information can simplify the design work on the other hand. Especially, the building information distributed according to this invention is digital data easy to edit and can be modified by the purchaser. Therefore, the purchaser, without the structure and the equipment completely coincident with the desired building, can easily select the desired building information.

In addition, according to the present invention, the manager can extend and promote the use of the buildings such as a steel house by providing the chance of distribution of the building information. Especially in the case where the manager is a member supplier, both the manager and the contractor can conduct the business efficiently by placing an order for parts through the building information distribution site. On the other hand, the manager providing the building information can gain a profit without paying the cost of purchasing the building information.

The invention claimed is:

1. An equipment for producing light gauge shape sheet steel for a steel house by supplying flat sheet steel on a main production line which includes an uncoiler, a leveler arranged downstream of the uncoiler, an end portion cutter arranged downstream of the leveler, a waiting table arranged downstream of the end portion cutter, a stationary fastening hole forming machine arranged downstream of the waiting table, and a roll forming machine arranged downstream of the stationary fastening hole forming machine, the equipment comprising:

a non-stationary fastening hole forming machine configured to form fastening holes without stopping a supply of the sheet steel, the non-stationary fastening hole forming machine being arranged downstream of the leveler, and independent of the stationary fastening hole forming machine.

2. The equipment according to claim 1, wherein the fastening holes that do not require a high machining accuracy are formed by the non-stationary fastening hole forming machine arranged during an operation of the leveler, and wherein the fastening holes that require the high machining accuracy are formed by the stationary fastening hole forming machine.

* * * * *